(12) United States Patent
Iwashita et al.

(10) Patent No.: US 9,963,636 B2
(45) Date of Patent: May 8, 2018

(54) LIQUID CRYSTAL COMPOSITION AND LIQUID CRYSTAL DISPLAY DEVICE USING SAME

(71) Applicant: DIC CORPORATION, Tokyo (JP)

(72) Inventors: Yoshinori Iwashita, Kita-adachi-gun (JP); Joji Kawamura, Kita-adachi-gun (JP); Makoto Negishi, Kita-adachi-gun (JP); Shinji Ogawa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days. days.

(21) Appl. No.: 14/765,458

(22) PCT Filed: Feb. 12, 2013

(86) PCT No.: PCT/JP2013/053242
§ 371 (c)(1),
(2) Date: Aug. 3, 2015

(87) PCT Pub. No.: WO2014/125564
PCT Pub. Date: Aug. 21, 2014

(65) Prior Publication Data
US 2015/0376500 A1    Dec. 31, 2015

(51) Int. Cl.
*G02F 1/1333* (2006.01)
*C09K 19/30* (2006.01)
*C09K 19/44* (2006.01)
*C09K 19/04* (2006.01)
*C09K 19/12* (2006.01)

(52) U.S. Cl.
CPC .......... *C09K 19/3003* (2013.01); *C09K 19/44* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01)

(58) Field of Classification Search
CPC .............. C09K 19/3003; C09K 19/44; C09K 2019/0448; C09K 2019/122; C09K 2019/123; C09K 2019/30047; C09K 2019/301; C09K 2019/3016; C09K 2019/3009; C09K 2019/3027; G02F 1/1333
USPC .............. 428/1.1; 252/299.01, 299.6, 299.63
See application file for complete search history.

(56) References Cited

U.S. PATENT DOCUMENTS

| 5,599,480 A | 2/1997 | Tarumi et al. |
| 9,074,132 B2 * | 7/2015 | Gotoh .................... C09K 19/14 |
| 2003/0048401 A1 | 3/2003 | Hanaoka et al. |
| 2006/0038936 A1 | 2/2006 | Hirosawa |
| 2010/0252777 A1 | 10/2010 | Klasen-Memmer et al. |
| 2011/0089373 A1 | 4/2011 | Yanai et al. |
| 2011/0248215 A1 | 10/2011 | Yamashita et al. |
| 2011/0248216 A1 | 10/2011 | Klasen-Memmer et al. |
| 2012/0162595 A1 | 6/2012 | Lee et al. |
| 2012/0236246 A1 | 9/2012 | Furusato et al. |
| 2013/0335693 A1 | 12/2013 | Klassen-Memmer et al. |
| 2014/0240653 A1 | 8/2014 | Lee et al. |

FOREIGN PATENT DOCUMENTS

| JP | 6-235925 A | 8/1994 |
| JP | 8-104869 A | 4/1996 |
| JP | 2002-357830 A | 12/2002 |
| JP | 2006-058755 A | 3/2006 |
| JP | 2008-505235 A | 2/2008 |
| JP | 2010-242086 A | 10/2010 |
| JP | 2011-105927 A | 6/2011 |
| JP | 2012-513483 A | 6/2012 |
| JP | 2013-503952 A | 2/2013 |
| WO | 2010/070979 A1 | 6/2010 |
| WO | 2010/072370 A1 | 7/2010 |
| WO | 2011/092973 A1 | 8/2011 |

OTHER PUBLICATIONS

International Search Report dated May 21, 2013, issued in counterpart application No. PCT/JP2013/053242 (1 page).

* cited by examiner

*Primary Examiner* — Geraldina Visconti
(74) *Attorney, Agent, or Firm* — Westerman, Hattori, Daniels & Adrian, LLP

(57) ABSTRACT

The present invention relates to a liquid crystal composition used in a liquid crystal display device. A problem to be solved by the invention is to provide a liquid crystal composition and a liquid crystal display device using the liquid crystal composition, the liquid crystal composition being suitable for a liquid crystal display device, causing little dropping marks during manufacture and realizing stable discharge of a liquid crystal material in an ODF process without degrading characteristics as a liquid crystal display device, such as dielectric anisotropy, bulk viscosity, nematic phase upper limit temperature, rotational viscosity $\gamma_1$, voltage holding ratio, etc. and image sticking characteristic of a display device. The present invention relates to a liquid crystal composition having negative dielectric anisotropy and containing compounds represented by formula (i) and formula (XIII-1-2) or formula (XIII-1-4) and also relates to a liquid crystal display device using the liquid crystal composition.

14 Claims, 1 Drawing Sheet

LIQUID CRYSTAL COMPOSITION AND LIQUID CRYSTAL DISPLAY DEVICE USING SAME

TECHNICAL FIELD

The present invention relates to a liquid crystal composition useful as a constituent member of liquid crystal display apparatuses and the like, and also relates to a liquid crystal display device.

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a VA (vertical alignment) mode using TFT (thin-film transistor), an IPS (in-plane switching) mode, and the like. Liquid crystal compositions used for these liquid crystal display devices are required to have stability to external factors such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have an optimum value of dielectric anisotropy ($\Delta\in$) or refractive index anisotropy ($\Delta n$) for a display device.

A vertical alignment-mode display uses a liquid crystal composition having negative $\Delta\in$ and is widely used for liquid crystal TV etc. On the other hand, low-voltage driving, fast response, and a wide operating temperature range are required for all driving methods. That is, a large absolute value of positive $\Delta\in$, low viscosity ($\eta$), and a high nematic-isotropic liquid phase transition temperature ($T_{ni}$) are required. Also, in view of setting of $\Delta n \times d$ which is the product of $\Delta n$ and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low $\gamma_1$ is required.

In order to constitute a liquid crystal composition having low $\gamma_1$, a compound having a dialkylbicyclohexane skeleton has been generally used (refer to Patent Literature 1). However, a bicyclohexane-based compound has the high effect of decreasing $\gamma_1$ but generally has high vapor pressure, and particularly, a compound having a short alkyl chain significantly tends to have high vapor pressure. Also, such a compound tends to have low $T_{ni}$, and thus an alkylbicylohexane-based compound having side chains with a total of 7 or more carbon atoms is frequently used. In the present situation, compounds having short side chains are not sufficiently investigated.

On the other hand, with expanding application of liquid crystal display devices, significant changes are found in use methods and manufacturing methods thereof. In order to cope with these changes, it is demanded to optimize characteristics other than basic physical property values which have been known. That is, VA (vertical alignment)-mode and IPS (in-plane switching)-mode liquid crystal display devices using liquid crystal compositions are widely used, and supersized liquid crystal devices of 50 inches or more are put into practical application. With increases in substrate size, instead of a usual vacuum injection method, a one drop fill (ODF) method becomes the mainstream of a method of injecting a liquid crystal composition into a substrate (refer to Patent Literature 2). However, when a liquid crystal composition is dropped on a substrate, the problem of degrading display quality by dropping marks is surfaced. Further, for the purpose of forming a pre-tilt angle of a liquid crystal material in a liquid crystal display device and of achieving fast response, a PS liquid crystal display device (polymer stabilized) and a PSA liquid crystal display device (polymer sustained alignment) are developed (refer to Patent Literature 3), but the problem of dropping marks becomes a larger problem. That is, these display devices are characterized by adding a monomer to a liquid crystal composition and curing the monomer in the composition. In a liquid crystal composition for an active matrix, usable compounds are specified in view of the necessity to maintain a high voltage holding ratio, and the use of compounds having an ester bond therein is limited. PSA liquid crystal display devices mainly use acrylate-based monomers, and compounds having an ester bond therein are generally used. Such compounds are generally not used as compounds for an active matrix (refer to Patent Literature 3). These foreign substances induce the occurrence of dropping marks, thereby causing the problem of degrading yield of liquid crystal display devices due to display defects. In addition, when additives such as an antioxidant, a light absorber, etc. are added to a liquid crystal composition, deterioration of yield becomes a problem.

"Dropping marks" is defined as a phenomenon that white dropping marks of a liquid crystal composition appear on a black display.

A method for suppressing dropping marks is disclosed, in which a polymer layer is formed in a liquid crystal layer formed by polymerizing a polymerizable compound mixed in a liquid crystal composition so that the occurrence of dropping marks due to a relation to an alignment control film is suppressed (refer to Patent Literature 4). However, there is demand for development of a liquid crystal display device causing little image sticking, dropping marks, and the like in a vertical alignment-mode display not a display mode in which a polymer layer is formed in a liquid crystal layer formed by polymerizing a polymerizable compound. In addition, the display mode in which a polymer layer is formed in a liquid crystal layer formed by polymerizing a polymerizable compound has the problem of causing image sticking of display due to the polymerizable compound added to a liquid crystal, and the effect of suppressing dropping marks is also unsatisfactory. Therefore, there is demand for development of a liquid crystal display device causing little image sticking and dropping marks while maintaining basic characteristics as a liquid crystal display device.

CITATION LIST

Patent Literature

PTL 1: Japanese Unexamined Patent Application Publication (Translation of PCT Application) No. 2008-505235
PTL 2: Japanese Unexamined Patent Application Publication No. 6-235925
PTL 3: Japanese Unexamined Patent Application Publication No. 2002-357830
PTL 4: Japanese Unexamined Patent Application Publication No. 2006-058755

SUMMARY OF INVENTION

Technical Problem

A problem to be solved by the invention is to provide a liquid crystal composition which is suitable for a liquid crystal display device, which causes little dropping marks during manufacture of a liquid crystal display device, and which realizes a stable discharge of a liquid crystal material in an ODF process without degrading characteristics as a liquid crystal display device, such as dielectric anisotropy, viscosity, nematic phase upper limit temperature, nematic phase stability at a low temperature, $\gamma_1$ etc. and image sticking characteristic of a display device, and also provide a liquid crystal display device using the liquid crystal composition.

Solution to Problem

In order to solve the problem, configurations of various liquid crystal compositions optimum for manufacturing a liquid crystal display device using the ODF method were researched, and consequently it was found that the occurrence of dropping marks in a liquid crystal display device can be suppressed by using specified liquid crystal compounds at a specified mixing ratio, leading to the achievement of the present invention.

The present invention provides a liquid crystal composition having negative dielectric anisotropy and containing a compound represented by formula (i)

[Chem. 1]

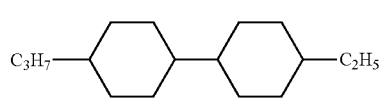

(i)

and one or two compounds represented by formula (XIII-1-2) or formula (XIII-1-4)

[Chem. 2]

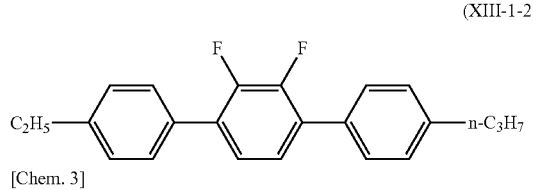

(XIII-1-2)

[Chem. 3]

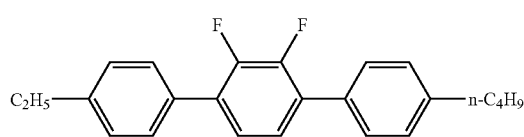

(XIII-1-4)

and also provides a liquid crystal display device using the liquid crystal composition.

Advantageous Effects of Invention

A liquid crystal display device of the present invention has the characteristics of excellent fast response and the occurrence of little image sticking and the characteristics of the occurrence of little dropping marks due to the manufacture thereof, and is thus useful for display devices of liquid crystal TV, a monitor, and the like.

Figure 1:
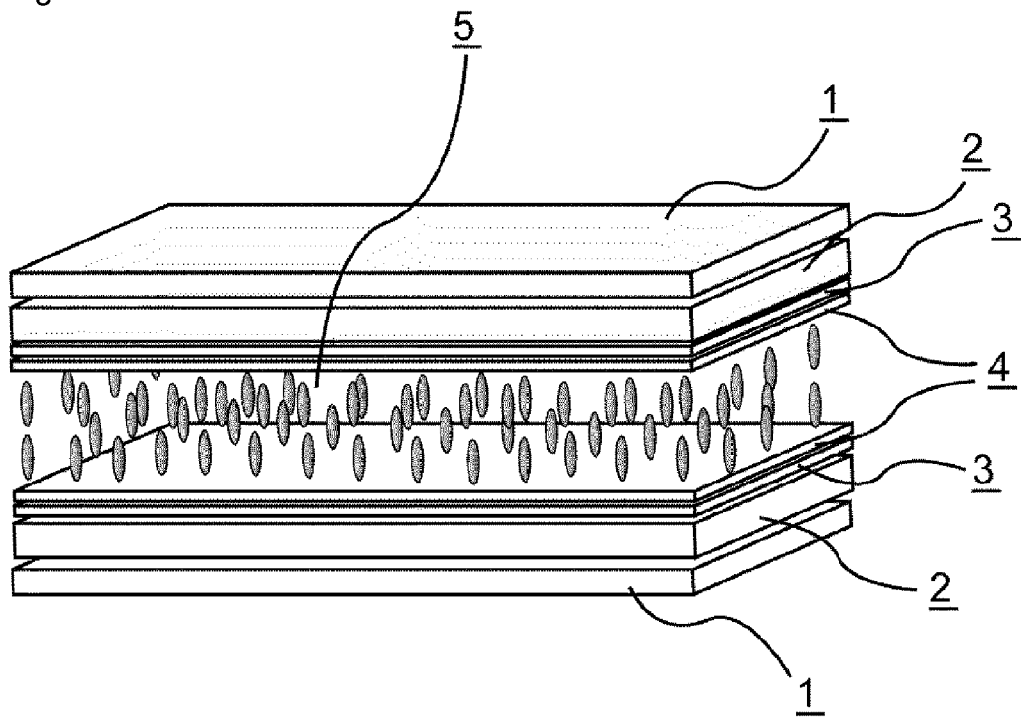
FIG. 1 is a drawing showing an example of a structure of a liquid crystal display device of the present invention.

REFERENCE SIGNS LIST 1 polarizing plate
2 substrate
3 transparent electrode or transparent electrode with active element
4 alignment film
5 liquid crystal
11 gate electrode
12 anodized film
13 gate insulating layer
14 transparent electrode
15 drain electrode
16 ohmic contact layer
17 semiconductor layer
18 protective film
19a source electrode 1
19b source electrode 2
100 substrate
101 protective layer

DESCRIPTION OF EMBODIMENTS

As described above, the process of occurrence of dropping marks is not known at present, but the occurrence of dropping marks is highly likely to relate to a correlation between impurities in a liquid crystal compound and an alignment film, chromatography, etc. Impurities in a liquid crystal compound are greatly influenced by a process for producing the compound, but methods for producing compounds different only in number of carbon atoms in side chains are not necessarily the same. That is, liquid crystal compounds are produced in a precise production process and thus highly cost among chemical products and are strongly required to be improved in production efficiency. Therefore, in order to use as low-cost raw material as possible, even when the numbers of carbon atoms in side chains are different by only one carbon atom, production from completely different raw materials exhibits higher efficiency in some cases. Therefore, the processes for producing liquid crystal base materials may be different from each other, and even in the same process, raw materials are mostly different from each other. Consequently, in many cases, impurities mixed in the respective base materials are different from each other. However, dropping marks possibly occur due to very small amounts of impurities, and there is a limit in suppressing the occurrence of dropping marks only by purifying the base materials.

On the other hand, a method for producing a general-purpose liquid crystal base material tends to be determined for each base material after a production process is established. Even at the present where an analytical technology is developed, it is not easy to completely determine what impurities are mixed, but it is necessary to design a composition on the assumption that impurities contained in each of the base materials are determined. As a result of research of a relation between impurities in a liquid crystal base material and dropping marks, the inventors of the present invention empirically clarified that even impurities contained in liquid crystal base materials include impurities which cause little dropping marks and impurities which easily cause dropping marks. Therefore, it was found that in order to suppress the occurrence of dropping marks, it is important to use specified compounds at a specified mixing ratio, and that there is a composition causing particularly little dropping marks. From the viewpoints described above, preferred embodiments described below have been achieved.

A liquid crystal composition of the present invention contains as a first component a compound represented by formula (i), preferably contains 15 to 50% by mass, more preferably contains 20 to 45% by mass, and still more preferably contains 25 to 40% by mass of the compound. More specifically, when fast response is regarded as important, 25 to 50% by mass of the compound is preferably contained, and when a drive voltage is regarded as more important, 20% by mass to 40% by mass of the compound is preferably contained.

A compound represented by formula (XIII-1-2) or formula (XIII-1-4) is contained as a second component, and the content of the second component is preferably 4 to 30% by mass, more preferably 7 to 25% by mass, still more preferably 10 to 25% by mass, and particularly preferably 11 to 25% by mass.

The liquid crystal composition of the present invention contains a compound represented by formula (i) as the first component and a compound represented by formula (XIII-1-2) or formula (XIII-1-4) as the second component, and a total content thereof is preferably 29 to 61% by mass, more preferably 31 to 58% by mass, still more preferably 33 to 50% by mass, and particularly preferably 35 to 47% by mass.

Further, the liquid crystal composition of the present invention can contain one or two or more compounds represented by general formula (L) as a third component.
[Chem. 4]

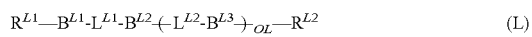

$$R^{L1}-B^{L1}-L^{L1}-B^{L2}-(L^{L2}-B^{L3})_{OL}-R^{L2} \quad (L)$$

(In the formula, $R^{L1}$ and $R^{L2}$ each independently represent an alkyl group having 1 to 8 carbon atoms; one or unadjacent two or more —CH$_2$— in the alkyl group may be each independently substituted by —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (one —CH$_2$— or unadjacent two or more —CH$_2$— present in the group may be substituted by —O—) and (b) a 1,4-phenylene group (one —CH= or unadjacent two or more —CH= present in the group may be substituted by —N=);

the groups (a) and the group (b) may be each independently substituted by any one of a cyano group, a fluorine atom, and a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and when OL is 2 or 3 and a plurality of $L^{L2}$ are present, $L^{L2}$ may be the same or different, and when OL is 2 or 3 and a plurality of $B^{L3}$ are present, $B^{L3}$ may be the same or different, wherein the compound represented by the formula (i) is excluded.)

When a ring structure to which each of $R^{L1}$ and $R^{L2}$ is bonded is a phenyl group (aromatic), $R^{L1}$ and $R^{L2}$ are each preferably a linear alkyl group having 1 to 5 carbon atoms, a linear alkoxy group having 1 to 4 (or more) carbon atoms, or an alkenyl group having 4 to 5 carbon atoms, and when a ring structure to which each of $R^{L1}$ and $R^{L2}$ is bonded is a saturated ring structure such as cyclohexane, pyran, dioxane, or the like, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

When the liquid crystal composition is required to have chemical stability, the compound represented by the general formula (L) preferably does not contain a chlorine atom in its molecule.

According to an embodiment, the lower limit of dielectric unisotropy (Δ∈) of the compound represented by the general formula (L) is −3; according to another embodiment, the lower limit is −2.5; according to still another embodiment, the lower limit is −2; and according to a further embodiment, the lower limit is −1.5. According to a further embodiment, the lower limit is −1; and according to a further embodiment, the lower limit is −0.5. On the other hand, according to an embodiment, the upper limit of dielectric unisotropy (Δ∈) of the compound represented by the general formula (L) is 3; according to another embodiment, the upper limit is 2.5; according to still another embodiment, the upper limit is 2; and according to a further embodiment, the upper limit is 1.5. According to a further embodiment, the upper limit is 1; and according to a further embodiment, the upper limit is 0.5.

The types of compounds which can be combined are not particularly limited, but the compounds are properly used in combination according to desired performance such as solubility at a low temperature, transition temperature, electric reliability, birefringence etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

In the liquid crystal composition of the present invention, it is necessary to properly adjust the content of the compound represented by the general formula (L) according to desired performance such as solubility at a low temperature, transition temperature, electric reliability, birefringence, process adaptability, dropping marks, image sticking, dielectric anisotropy, volatility, or the like.

For example, according to another embodiment of the present invention, the lower limit of the preferred content relative to a total amount of the liquid crystal composition of the present invention is 5%. According to still another embodiment of the present invention, the lower limit is 10%. According to a further embodiment of the present invention, the lower limit is 15%. According to a further embodiment of the present invention, the lower limit is 20%. According to a further embodiment of the present invention, the lower limit is 25%.

Further, for example, according to another embodiment of the present invention, the upper limit of the preferred content relative to a total amount of the liquid crystal composition of the present invention is 45%. According to still another embodiment of the present invention, the upper limit is 40%. According to a further embodiment of the present invention, the upper limit is 35%. According to a further embodiment of the present invention, the upper limit is 30%. According to a further embodiment of the present invention, the upper limit is 25%. According to a further embodiment of the present invention, the upper limit is 20%.

For example, according to an embodiment of the present invention, the range of the preferred content relative to a total amount of the liquid crystal composition of the present invention is 5% to 25%. According to another embodiment of the present invention, the range is 10% to 30%. According to still another embodiment of the present invention, the range is 15% to 35%. According to a further embodiment of the present invention, the range is 20% to 40%. According to a further embodiment of the present invention, the range is 25% to 45%.

When the viscosity of the liquid crystal composition of the present invention is kept low and the liquid crystal composition having a high response speed is required, both the lower limit and the upper limit are preferably high. Further, when Tni of the liquid crystal composition of the present invention is kept high and the liquid crystal composition having good temperature stability is required, both the lower limit and the upper limit are preferably high. In addition, when dielectric anisotropy is desired to be increased for keeping the drive voltage low, both the lower limit and the upper limit are preferably low.

Further, the compound represented by the general formula (L) is preferably a compound selected from a compound group represented by general formula (I) to general formula (V).

[Chem. 5]

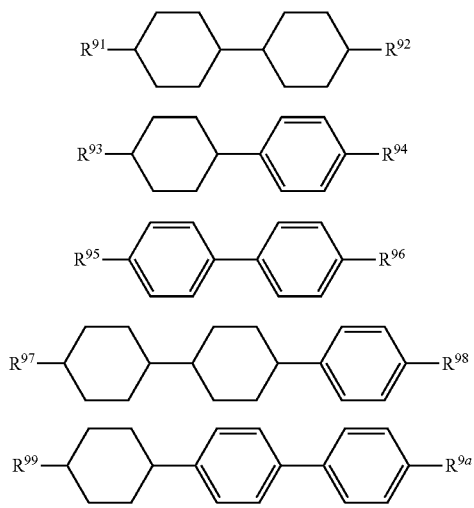

(In the formulae, $R^{91}$ to $R^{9a}$ each independently represent an alkyl group having 1 to 10 carbon atoms, an alkoxy group having 1 to 10 carbon atoms, or an alkenyl group having 2 to 10 carbon atoms, wherein a compound in which in the general formula (I), $R^{91}$ represents an alkyl group having 3 carbon atoms, and $R^{92}$ represents an alkyl group having 2 carbon atoms is excluded.)

When a compound selected from the compound group represented by the general formula (I) to the general formula (V) is contained, one to ten compounds are preferably contained, one to five compounds are particularly preferably contained, and also two or more compounds are preferably contained. In this case, the content is preferably 5% to 40% by mass, more preferably 8% to 35% by mass, and particularly preferably 10% to 30% by mass.

$R^{91}$ to $R^{9a}$ each independently preferably represent an alkyl group having 1 to 10 carbon atoms, an alkenyl group having 2 to 10 carbon atoms, or an alkoxy group having 2 to 10 carbon atoms, and more preferably represent an alkyl group having 1 to 5 carbon atoms, an alkenyl group having 2 to 5 carbon atoms, or an alkoxy group having 2 to 5 carbon atoms, and an alkenyl group preferably has a structure represented by formula (Alkenyl-1) to formula (Alkenyl-4) described below

[Chem. 6]

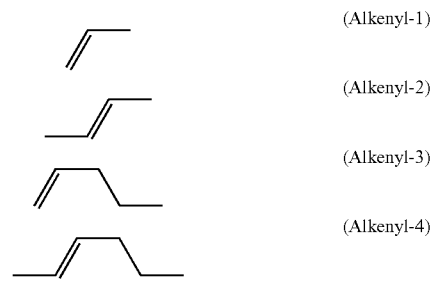

(in the formulae, the right end is bonded to a ring structure). When the liquid crystal composition of the present invention contains a reactive monomer, structures represented by the formula (Alkenyl-2) and the formula (Alkenyl-4) are preferred, and a structure represented by the formula (Alkenyl-2) is more preferred.

Also, $R^{91}$ and $R^{92}$ may be the same or different, and preferably represent different substituents.

Further, the compound represented by the general formula (I) is preferably a compound selected from a compound group represented by general formula (I-a).

[Chem. 7]

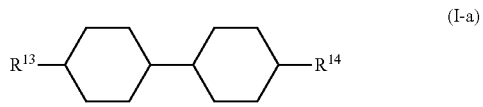

(In the formula, $R^{13}$ and $R^{14}$ each independently represent an alkyl group having 1 to 5 carbon atoms, wherein a compound having a combination of $R^{13}$ and $R^{14}$ representing alkyl groups having 3 and 2 carbon atoms is excluded.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to still another embodiment of the present invention, the number of the types is 3 or more.

In the liquid crystal composition of the present invention, it is necessary to properly adjust the content of the compound represented by the general formula (I-a) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 3%. According to another embodiment of the present invention, the lower limit is 8%. According to a further embodiment of the present invention, the lower limit is 15%. According to a further embodiment of the present invention, the lower limit is 20%.

Further, for example, according to an embodiment of the present invention, the upper limit of the preferred content relative to a total amount of the liquid crystal composition of the present invention is 55%. According to another embodiment of the present invention, the upper limit is 45%. According to a further embodiment of the present invention, the upper limit is 40%. According to a further embodiment of the present invention, the upper limit is 30%. According to a further embodiment of the present invention, the upper limit is 20%. According to a further embodiment of the present invention, the upper limit is 15%.

For example, according to an embodiment of the present invention, the range of the preferred content relative to a total amount of the liquid crystal composition of the present invention is 3% to 15%. According to another embodiment of the present invention, the range is 5% to 20%. According to still another embodiment of the present invention, the range is 10% to 30%. According to a further embodiment of the present invention, the range is 15% to 40%. According to a further embodiment of the present invention, the range is 20% to 45%. More specifically, the compound represented by the general formula (I-a) is preferably a compound described below.

[Chem. 8]

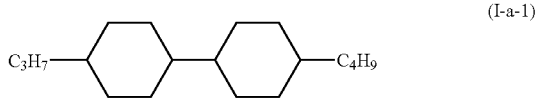

(I-a-1)

[Chem. 9]

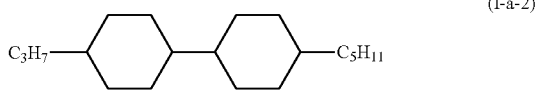

(I-a-2)

[Chem. 10]

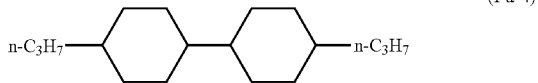

(I-a-4)

Compounds represented by formula (I-a-1) and formula (I-a-2) are preferred. When it is desired to manufacture a liquid crystal display device having high Tni and being capable of stable display even at a high temperature, the contents of compounds represented by the formula (I-a-1) and the formula (I-a-2) are preferably slightly increased.

Further, the compound represented by the general formula (I) is preferably a compound selected from a compound group represented by general formula (I-b).

[Chem. 11]

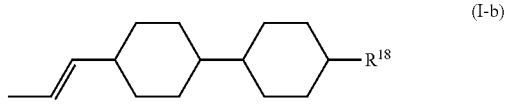

(I-b)

(In the formula, $R^{18}$ each independently represent an alkyl group having 1 to 5 carbon atoms, an alkenyl group having 2 to 5 carbon atoms, or an alkoxy group having 1 to 5 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to still another embodiment of the present invention, the number of the types is 3 or more.

In the liquid crystal composition of the present invention, it is necessary to properly adjust the content of the compound represented by the general formula (I-b) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 2%. According to another embodiment of the present invention, the lower limit is 3%. According to still another embodiment of the present invention, the lower limit is 5%. According to a further embodiment of the present invention, the lower limit is 8%. According to a further embodiment of the present invention, the lower limit is 11%. According to a further embodiment of the present invention, the lower limit is 15%. According to a further embodiment of the present invention, the lower limit is 20%.

Further, for example, according to another embodiment of the present invention, the upper limit of the preferred content relative to a total amount of the liquid crystal composition of the present invention is 40%. According to still another embodiment of the present invention, the upper limit is 35%. According to a further embodiment of the present invention, the upper limit is 30%. According to a further embodiment of the present invention, the upper limit is 25%. According to a further embodiment of the present invention, the upper limit is 20%. According to a further embodiment of the present invention, the upper limit is 15%.

For example, according to an embodiment of the present invention, the range of the preferred content relative to a total amount of the liquid crystal composition of the present invention is 2% to 15%. According to another embodiment of the present invention, the range is 4% to 15%. According to still another embodiment of the present invention, the range is 8% to 15%. According to a further embodiment of the present invention, the range is 11% to 20%. According to a further embodiment of the present invention, the range is 15% to 25%. According to a further embodiment of the present invention, the range is 20% to 30%. According to a further embodiment of the present invention, the range is 25% to 35%. According to a further embodiment of the present invention, the range is 30% to 40%.

More specifically, the compound represented by the formula (I-b) is preferably a compound described below.

[Chem. 12]

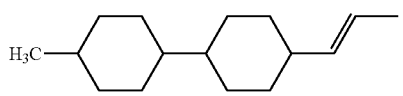
(1-b-1)

[Chem. 13]

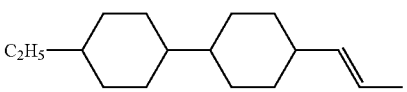
(1-b-2)

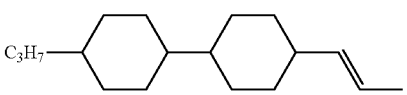
(1-b-3)

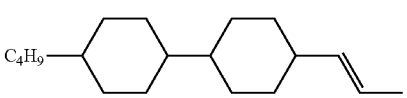
(1-b-4)

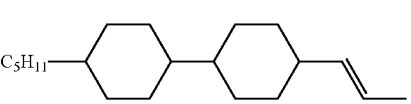
(1-b-5)

A compound represented by formula (I-b-2) or formula (I-b-3) is preferred, and a compound represented by formula (I-b-3) is more preferred.

Further, the compound represented by the general formula (I) is preferably a compound selected from a compound group represented by general formula (I-c).

[Chem. 14]

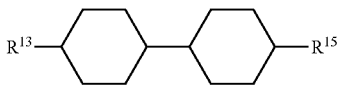
(I-c)

(In the formula, $R^{13}$ represents an alkyl group having 1 to 5 carbon atoms, and $R^{15}$ represents an alkoxy group having 1 to 4 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to still another embodiment of the present invention, the number of the types is 3 or more.

In the liquid crystal composition of the present invention, it is necessary to properly adjust the content of the compound represented by the general formula (I-c) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 2%. According to another embodiment of the present invention, the lower limit is 4%. According to still another embodiment of the present invention, the lower limit is 6%. According to a further embodiment of the present invention, the lower limit is 10%.

Further, for example, according to another embodiment of the present invention, the upper limit of the preferred content relative to a total amount of the liquid crystal composition of the present invention is 25%. According to still another embodiment of the present invention, the upper limit is 20%. According to a further embodiment of the present invention, the upper limit is 15%.

For example, according to an embodiment of the present invention, the range of the preferred content relative to a total amount of the liquid crystal composition of the present invention is 2% to 15%. According to another embodiment of the present invention, the range is 4% to 20%. According to still another embodiment of the present invention, the range is 6% to 25%.

When solubility at a low temperature is regarded as important, a high effect is obtained by slightly increasing the content, and conversely when the response speed is regarded as important, a high effect is obtained by slightly decreasing the content. Further, when dropping marks and image sticking are improved, the content range is preferably set to a medium range.

More specifically, the compound represented by the general formula (I-c) is preferably a compound described below.

[Chem. 15]

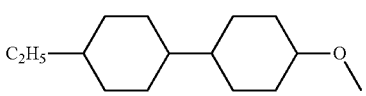
(I-c-1)

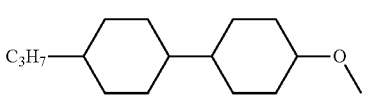
(I-c-2)

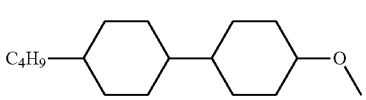
(I-c-3)

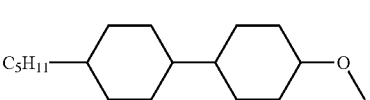
(I-c-4)

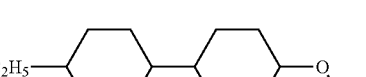
(I-c-5)

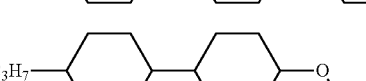
(I-c-6)

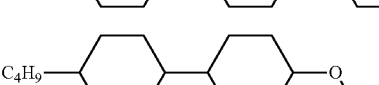
(I-c-7)

(I-c-8)

[Chem. 16]

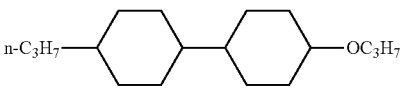
(I-c-9)

A compound represented by formula (I-c-1), formula (I-c-2), or formula (I-c-3) is preferred.

The liquid crystal composition of the present invention can further contain a compound represented by formula (I-d-1) having a structure similar to the compound represented by the general formula (I).

[Chem. 17]

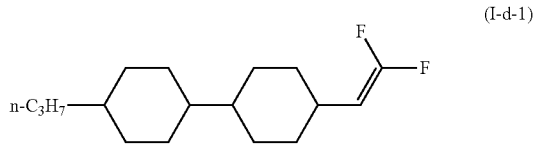

(I-d-1)

The content of the compound represented by the formula (I-d-1) is preferably adjusted according to desired performance such as solubility at a low temperature, transition temperature, electric reliability, birefringence, or the like. The compound is preferably contained at a content of 5% by mass or more and 32% by mass or less, more preferably 8% by mass or more and 32% by mass or less, still more preferably 12% by mass or more and 32% by mass or less, and particularly preferably 15% by mass or more and 32% by mass or less relative to a total amount of the liquid crystal composition of the present invention.

Further, the compound represented by the general formula (I) is preferably a compound selected from a compound group represented by general formula (I-e).

[Chem. 18]

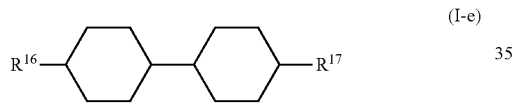

(I-e)

(In the formula, $R^{16}$ and $R^{17}$ each independently represent an alkenyl group having 2 to 5 carbon atoms.)

The types of compounds which can be combined are not particularly limited, but the compounds are used alone or in combination of two or three or more according to desired performance such as solubility at a low temperature, transition temperature, electric reliability, birefringence, or the like. According to desired performance such as solubility at a low temperature, transition temperature, electric reliability, birefringence, process adaptability, dropping marks, image sticking, dielectric anisotropy, or the like, the content of the compound represented by the general formula (I-e) relative to a total amount of the liquid crystal composition of the present invention is preferably 5% by mass or more, more preferably 10% by mass, more preferably 15% by mass or more, more preferably 20% by mass or more, more preferably 25% by mass or more, and particularly preferably 30% by mass or more. Also, the maximum allowable content is preferably 50% by mass or less, more preferably 45% by mass or less, and particularly preferably 40% by mass or less.

The range of the preferred content relative to a total amount of the liquid crystal composition of the present invention is preferably 5% by mass or more and 25% by mass or less, more preferably 10% by mass or more and 30% by mass or less, more preferably 15% by mass or more and 35% by mass or less, more preferably 20% by mass or more and 40% by mass or less, and more preferably 25% by mass or more and 45% by mass or less.

Further, the compound represented by the general formula (I-e) is preferably a compound selected from a compound group represented by formula (I-e-1) to formula (I-e-10), and compounds represented by the formula (I-e-2), formula (I-e-4), and formula (I-e-7) are preferred.

[Chem. 19]

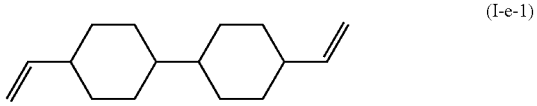

(I-e-1)

[Chem. 20]

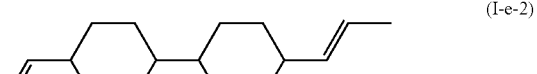

(I-e-2)

[Chem. 21]

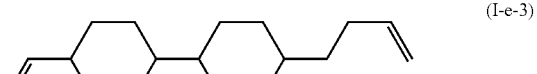

(I-e-3)

[Chem. 22]

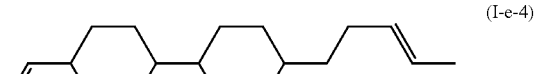

(I-e-4)

[Chem. 23]

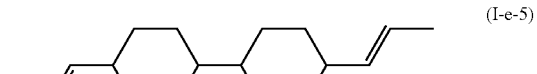

(I-e-5)

[Chem. 24]

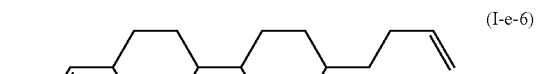

(I-e-6)

[Chem. 25]

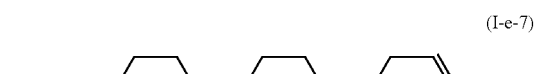

(I-e-7)

[Chem. 26]

(I-e-8)

[Chem. 27]

(I-e-9)

[Chem. 28]

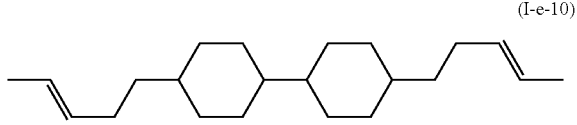

(I-e-10)

Further, the compound represented by the general formula (II) is preferably a compound selected from a compound group represented by general formula (II-a).

[Chem. 29]

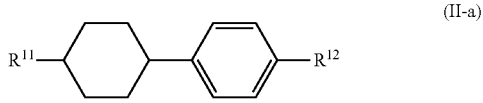

(II-a)

(In the formula, $R^{11}$ represents an alkyl group having 1 to 5 carbon atoms, an alkenyl group having 2 to 5 carbon atoms, or an alkoxy group having 1 to 4 carbon atoms, and $R^{12}$ represents an alkyl group having 1 to 5 carbon atoms, an alkenyl group having 4 to 5 carbon atoms, or an alkoxy group having 1 to 4 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2.

In the liquid crystal composition of the present invention, it is necessary to properly adjust the content of the compound represented by the general formula (II-a) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 1%. According to another embodiment of the present invention, the lower limit is 4%. According to still another embodiment of the present invention, the lower limit is 7%. According to a further embodiment of the present invention, the lower limit is 12%. According to a further embodiment of the present invention, the lower limit is 15%. According to a further embodiment of the present invention, the lower limit is 20%. According to a further embodiment of the present invention, the lower limit is 25%. According to a further embodiment of the present invention, the lower limit is 30%.

Further, for example, according to another embodiment of the present invention, the upper limit of the preferred content relative to a total amount of the liquid crystal composition of the present invention is 40%. According to still another embodiment of the present invention, the upper limit is 35%. According to a further embodiment of the present invention, the upper limit is 30%. According to a further embodiment of the present invention, the upper limit is 20%. According to a further embodiment of the present invention, the upper limit is 15%. According to a further embodiment of the present invention, the upper limit is 10%. According to a further embodiment of the present invention, the upper limit is 8%.

For example, according to an embodiment of the present invention, the range of the preferred content relative to a total amount of the liquid crystal composition of the present invention is 3% to 8%. According to another embodiment of the present invention, the range is 5% to 13%. According to still another embodiment of the present invention, the range is 7% to 18%. According to a further embodiment of the present invention, the range is 11% to 20%. According to a further embodiment of the present invention, the range is 13% to 25%. According to a further embodiment of the present invention, the range is 15% to 30%.

When solubility at a low temperature is regarded as important, a high effect is obtained by slightly increasing the content, and conversely when the response speed is regarded as important, a high effect is obtained by slightly decreasing the content. Further, when dropping marks and image sticking are improved, the content range is preferably set to a medium range.

More specifically, the compound represented by the general formula (II-a) is preferably a compound described below.

[Chem. 30]

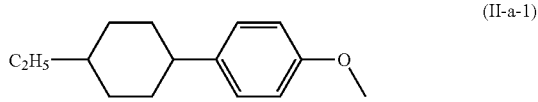

(II-a-1)

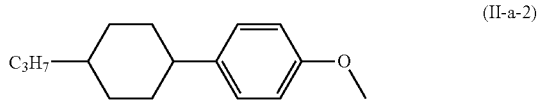

(II-a-2)

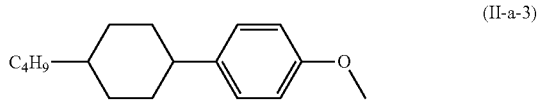

(II-a-3)

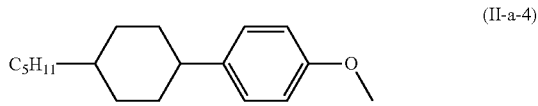

(II-a-4)

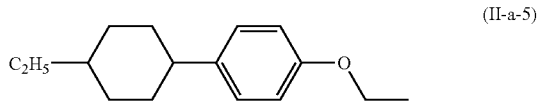

(II-a-5)

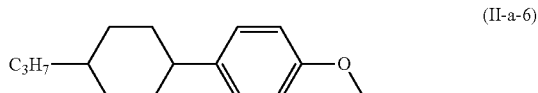

(II-a-6)

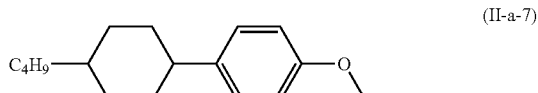

(II-a-7)

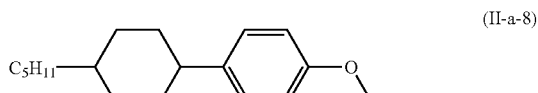

(II-a-8)

[Chem. 31]

(II-a-9)

[Chem. 32]

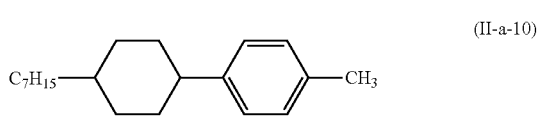

(II-a-10)

[Chem. 33]

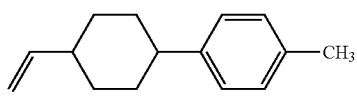
(II-a-11)

[Chem. 34]

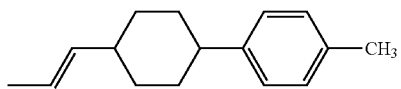
(II-a-12)

[Chem. 35]

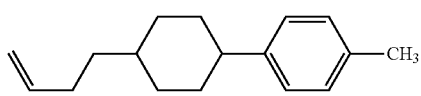
(II-a-13)

[Chem. 36]

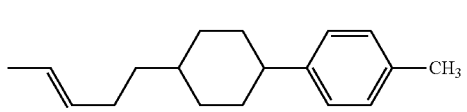
(II-a-14)

Further, a compound represented by formula (II-a-1), formula (II-a-2), formula (II-a-3), or formula (II-a-6) is preferred.

The liquid crystal composition of the present invention may further contain a compound selected from a compound group represented by general formula (II-b) having a structure similar to the compound represented by the general formula (II).

[Chem. 37]

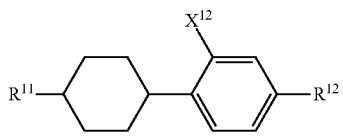
(II-b)

(In the formula, $R^{11}$ represents an alkyl group having 1 to 5 carbon atoms, an alkenyl group having 2 to 5 carbon atoms, or an alkoxy group having 1 to 4 carbon atoms, and $R^{12}$ represents an alkyl group having 1 to 5 carbon atoms, an alkenyl group having 4 to 5 carbon atoms, or an alkoxy group having 1 to 4 carbon atoms.)

The compound represented by the general formula (II-b) is preferably contained at a content of 1% by mass or more and 6% by mass or less, more preferably 3% by mass or more and 8% by mass or less, still more preferably 6% by mass or more and 15% by mass or less, more preferably 8% by mass or more and 20% by mass or less, and more preferably 10% by mass or more and 25% by mass or less relative to a total amount of the liquid crystal composition of the present invention.

Further, the compound represented by the general formula (II-b) is preferably a compound represented by formula (II-b-1).

[Chem. 38]

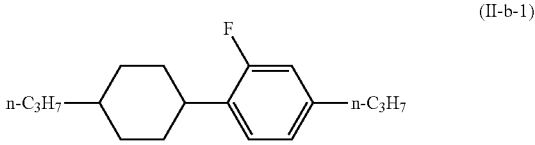
(II-b-1)

Further, the compound represented by the general formula (III) is preferably a compound selected from a compound group represented by general formula (III-a).

[Chem. 39]

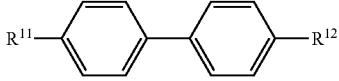
(III-a)

(In the formula, $R^{11}$ represents an alkyl group having 1 to 5 carbon atoms, an alkenyl group having 2 to 5 carbon atoms, or an alkoxy group having 1 to 4 carbon atoms, and $R^{12}$ represents an alkyl group having 1 to 5 carbon atoms, an alkenyl group having 4 to 5 carbon atoms, or an alkoxy group having 1 to 4 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2 or more.

In the liquid crystal composition of the present invention, it is necessary to properly adjust the content of the compound represented by the general formula (III-a) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 3%. According to another embodiment of the present invention, the lower limit is 5%. According to a further embodiment of the present invention, the lower limit is 8%. According to still another embodiment of the present invention, the lower limit is 10%. According to a further embodiment of the present invention, the lower limit is 12%. According to a further embodiment of the present invention, the lower limit is 15%. According to a further embodiment of the present invention, the lower limit is 20%.

Further, for example, according to another embodiment of the present invention, the upper limit of the preferred content relative to a total amount of the liquid crystal composition of the present invention is 35%. According to still another embodiment of the present invention, the upper limit is 30%.

For example, according to an embodiment of the present invention, the range of the preferred content relative to a total amount of the liquid crystal composition of the present invention is 3% to 15%. According to another embodiment of the present invention, the range is 5% to 15%. According to still another embodiment of the present invention, the range is 12% to 25%. According to a further embodiment of the present invention, the range is 15% to 30%. According to a further embodiment of the present invention, the range is 20% to 35%.

When high birefringence is achieved, a high effect is obtained by setting the content to a higher value, and conversely when high Tni is regarded as important, a high effect is obtained by setting the content at a lower value. Further, when dropping marks and image sticking are improved, the content range is preferably set to a medium range.

More specifically, the compound represented by the general formula (III-a) is preferably a compound described below.

[Chem. 40]

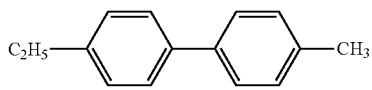
(III-a-1)

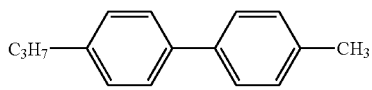
(III-a-2)

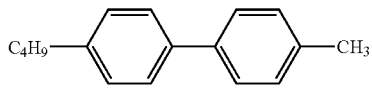
(III-a-3)

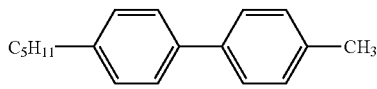
(III-a-4)

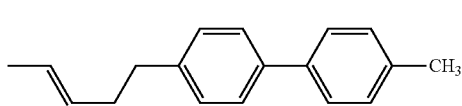
(III-a-5)

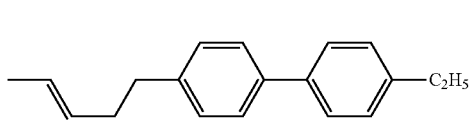
(III-a-6)

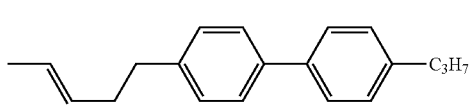
(III-a-7)

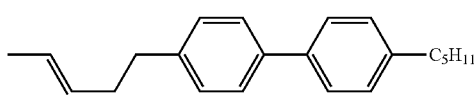
(III-a-8)

[Chem. 41]

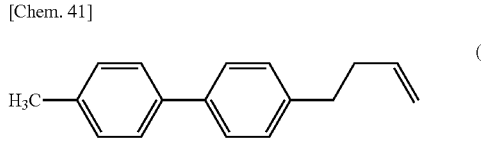
(III-a-9)

Further, a compound represented by formula (III-a-2), formula (III-a-3), or formula (III-a-4) is preferred.

The liquid crystal composition of the present invention can further contain a compound selected from a compound group represented by general formula (III-b) having a structure similar to the compound represented by the general formula (III).

[Chem. 42]

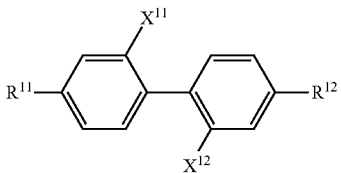
(III-b)

(In the formula, $R^{11}$ represents an alkyl group having 1 to 5 carbon atoms, an alkenyl group having 2 to 5 carbon atoms, or an alkoxy group having 1 to 4 carbon atoms, $R^{12}$ represents an alkyl group having 1 to 5 carbon atoms, an alkenyl group having 4 to 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ is a fluorine atom.)

The compound represented by the general formula (III-b) is preferably contained at a content of 2% by mass or more, more preferably 4% by mass, still more preferably 6% by mass or more, more preferably 9% by mass or more, and more preferably 12% by mass or more relative to a total amount of the liquid crystal composition of the present invention.

The range of the preferred content relative to a total amount of the liquid crystal composition of the present invention is preferably 2% by mass or more and 15% by mass or less, more preferably 5% by mass or more and 18% by mass or less, and more preferably 9% by mass or more and 25% by mass or less.

Further, the compound represented by the general formula (III-b) is preferably a compound represented by formula (III-b-1).

[Chem. 43]

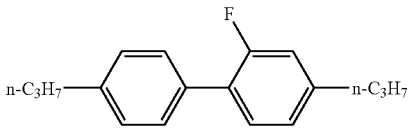
(III-b-1)

Further, the compound the general formula (IV) is preferably a compound selected from a compound group represented by, for example, general formula (IV-a).

[Chem. 44]

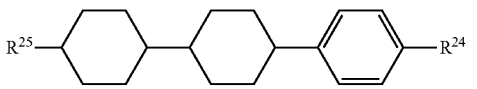
(IV-a)

($R^{25}$ represents an alkyl group having 1 to 5 carbon atoms and $R^{24}$ represents an alkyl group having 1 to 5 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2 or more.

In the liquid crystal composition of the present invention, it is necessary to properly adjust the content of the compound represented by the general formula (IV-a) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 3%. According to another embodiment of the present invention, the lower limit is 5%. According to still another embodiment of the present invention, the lower limit is 7%. According to a further embodiment of the present invention, the lower limit is 10%. According to a further embodiment of the present invention, the lower limit is 14%.

Further, for example, according to another embodiment of the present invention, the upper limit of the preferred content relative to a total amount of the liquid crystal composition of the present invention is 20%. According to still another embodiment of the present invention, the upper limit is 15%. According to a further embodiment of the present invention, the upper limit is 10%. According to a further embodiment of the present invention, the upper limit is 5%.

For example, according to an embodiment of the present invention, the range of the preferred content relative to a total amount of the liquid crystal composition of the present invention is 3% to 15%. According to another embodiment of the present invention, the range is 5% to 15%. According to still another embodiment of the present invention, the range is 7% to 15%. According to a further embodiment of the present invention, the range is 10% to 20%.

More specifically, the compound represented by the general formula (IV-a) is preferably a compound described below.

[Chem. 45]

(IV-a-1)

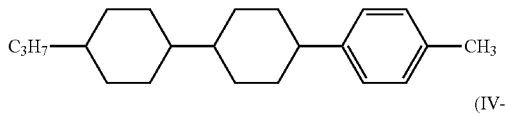

(IV-a-2)

A compound represented by formula (IV-a-2) is preferred.

Further, the compound represented by the general formula (IV) is preferably a compound selected from a compound group represented by, for example, general formula (IV-b).

[Chem. 46]

(IV-b)

($R^{25}$ represents an alkyl group having 1 to 5 carbon atoms and $R^{26}$ represents an alkoxy group having 1 to 4 carbon atoms.)

The types of compounds which can be combined are not particularly limited, but the compounds are used alone or in combination of two or three according to desired performance such as solubility at a low temperature, transition temperature, electric reliability, birefringence, or the like.

The content of the compound represented by the general formula (IV-b) is preferably adjusted according to desired performance such as solubility at a low temperature, transition temperature, electric reliability, birefringence, or the like, and the content is preferably 1% by mass or more, more preferably 4% by mass or more, and still more preferably 8% by mass or more. The maximum allowable content is preferably 15% by mass or less, more preferably 10% by mass or less, and still more preferably 8% by mass or less.

The range of the preferred content is preferably 1% by mass or more and 10% by mass or less, more preferably 4% by mass or more and 12% by mass or less, and more preferably 8% by mass or more and 15% by mass or less.

Further, preferred examples of the compound represented by the general formula (IV-b) include compounds represented by formula (IV-b-1) to formula (IV-b-4), and a compound represented by the formula (IV-b-3) is particularly preferred.

[Chem. 47]

(IV-b-1)

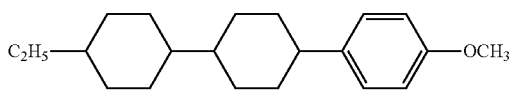

[Chem. 48]

(IV-b-2)

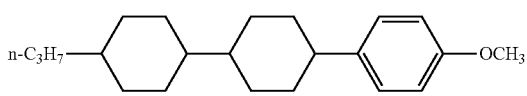

[Chem. 49]

(IV-b-3)

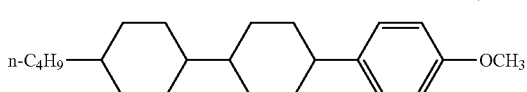

[Chem. 50]

(IV-b-4)

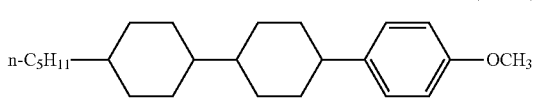

Further, the compound represented by the general formula (IV) may be a compound selected from a compound group represented by, for example, general formula (IV-c).

[Chem. 51]

(IV-c)

($R^{23}$ represents an alkenyl group having 2 to 5 carbon atoms and $R^{24}$ represents an alkyl group having 1 to 5 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2 or more.

In the liquid crystal composition of the present invention, it is necessary to properly adjust the content of the compound represented by the general formula (IV-c) according to desired performance such as solubility at a low temperature, transition temperature, electric reliability, birefringence, process adaptability, dropping marks, image sticking, dielectric anisotropy, or the like. For example, according to an embodiment of the present invention, the lower limit of the preferred content relative to a total amount of the liquid crystal composition of the present invention is 3%. According to another embodiment of the present invention, the lower limit is 5%. According to still another embodiment of the present invention, the lower limit is 5%. According to a further embodiment of the present invention, the lower limit is 10%. According to a further embodiment of the present invention, the lower limit is 14%. According to a further embodiment of the present invention, the lower limit is 16%.

Further, for example, according to another embodiment of the present invention, the upper limit of the preferred content relative to a total amount of the liquid crystal composition of the present invention is 20%. According to still another embodiment of the present invention, the upper limit is 15%. According to a further embodiment of the present invention, the upper limit is 10%. According to a further embodiment of the present invention, the upper limit is 5%.

For example, according to an embodiment of the present invention, the range of the preferred content relative to a total amount of the liquid crystal composition of the present invention is 3% to 12%. According to another embodiment of the present invention, the range is 5% to 12%. According to still another embodiment of the present invention, the range is 7% to 15%. According to a further embodiment of the present invention, the range is 10% to 20%.

Further, preferred examples of the compound represented by the general formula (IV-c) include compounds represented by formula (IV-c-1) to formula (IV-c-3).

[Chem. 52]

(IV-c-1)

[Chem. 53]

(IV-c-2)

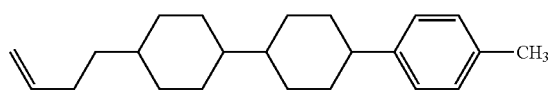

[Chem. 54]

(IV-c-3)

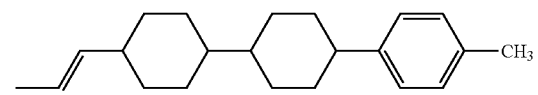

According to desired performance such as solubility at a low temperature, transition temperature, electric reliability, birefringence, or the like, a compound represented by the formula (IV-c-1) may be contained, a compound represented by the formula (IV-c-2) may be contained, both the compound represented by the formula (IV-c-1) and the compound represented by the formula (IV-c-2) may be contained, or all the compounds represented by the formula (IV-c-1) to the formula (IV-c-3) may be contained. The content of the compound represented by the formula (IV-c-1) or the formula (IV-c-2) relative to the total amount of the liquid crystal composition of the present invention is preferably 3% by mass, more preferably 5% by mass or more, more preferably 7% by mass or more, more preferably 9% by mass or more, and more preferably 11% by mass or more. The maximum allowable content is preferably 20% by mass or less, more preferably 15% by mass or less, and still more preferably 13% by mass or less.

Further, the range of the preferred content is preferably 3% by mass or more and 15% by mass or less, more preferably 5% by mass or more and 15% by mass or less, more preferably 7% by mass or more and 15% by mass or less, and more preferably 9% by mass or more and 18% by mass or less.

The content of the compound represented by the formula (IV-c-2) relative to the total amount of the liquid crystal composition of the present invention is preferably 3% by mass, more preferably 5% by mass or more, more preferably 8% by mass or more, and more preferably 10% by mass or more. The allowable maximum content is preferably 20% by mass or less, more preferably 15% by mass or less, and still more preferably 12% by mass or less.

When both the compound represented by the formula (IV-c-1) and the compound represented by the formula (IV-c-2) are contained, the total of both compounds relative to the total amount of the liquid crystal composition of the present invention is preferably 8% by mass or more and more preferably 13% by mass or more. The maximum allowable content is preferably 25% by mass or less, more preferably 20% by mass or less, and still more preferably 15% by mass or less.

Further, the range of the preferred content is preferably 5% by mass or more and 20% by mass or less, more preferably 8% by mass or more and 18% by mass or less, and more preferably 10% by mass or more and 18% by mass or less.

Further, the compound represented by the general formula (V) is preferably a compound selected from a compound group represented by general formula (V-a).

[Chem. 55]

(V-a)

($R^{31}$ represents an alkenyl group having 1 to 5 carbon atoms and $R^{32}$ represents an alkyl group having 1 to 5 carbon atoms or an alkoxy group having 1 to 4 carbon atoms.)

More specifically, the compound represented by the general formula (V-a) is preferably a compound described below.

[Chem. 56]

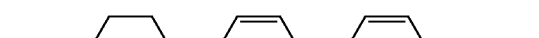
(V-a-1)

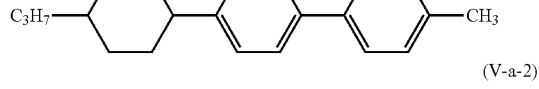
(V-a-2)

[Chem. 57]

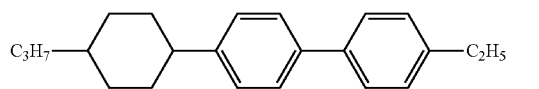
(V-a-3)

Further, the compound represented by the general formula (V) is preferably a compound selected from a compound group represented by general formula (V-b).

[Chem. 58]

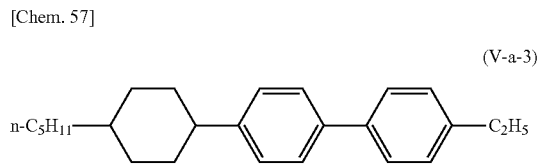
(V-b)

($R^{33}$ represents an alkenyl group having 2 to 5 carbon atoms and $R^{32}$ each independently represent an alkyl group having 1 to 5 carbon atoms or an alkoxy group having 1 to 4 carbon atoms.)

The content is preferably adjusted according to desired performance such as solubility at a low temperature, transition temperature, electric reliability, birefringence, or the like, and the content is preferably 4% by mass or more, more preferably 6% by mass or more, and still more preferably 10% by mass or more. The maximum allowable content is preferably 20% by mass or less, more preferably 15% by mass or less, and still more preferably 10% by mass or less. Further, the range of the preferred content is preferably 4% by mass or more and 13% by mass or less, more preferably 6% by mass or more and 13% by mass or less, and more preferably 8% by mass or more and 13% by mass or less.

The compound represented by the general formula (V-b) is preferably a compound represented by, for example, formula (V-b-1) or formula (V-b-2).

[Chem. 59]

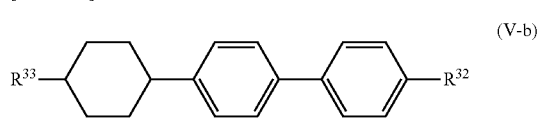
(V-b-1)

[Chem. 60]

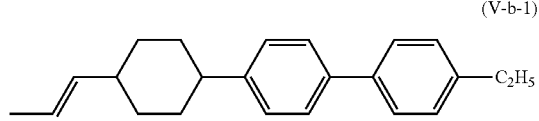
(V-b-2)

Further, the compound represented by the general formula (V) is preferably a compound selected from a compound group represented by general formula (V-c).

[Chem. 61]

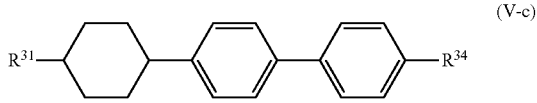
(V-c)

($R^{31}$ represents an alkenyl group having 1 to 5 carbon atoms and $R^{34}$ represents an alkoxy group having 1 to 4 carbon atoms.)

The content of the compound represented by the general formula (V-c) is preferably adjusted according to desired performance such as solubility at a low temperature, transition temperature, electric reliability, birefringence, or the like, and the content is preferably 4% by mass or more, more preferably 6% by mass or more, and still more preferably 10% by mass or more. The permissible maximum content is preferably 18% by mass or less, more preferably 13% by mass or less, and still more preferably 8% by mass or less.

Further, the range of the preferred content is preferably 4% by mass or more and 10% by mass or less and more preferably 6% by mass or more and 10% by mass or less.

Further, preferred examples of the compound represented by the general formula (V-c) include compounds represented by formula (V-c-1) to formula (V-c-3), and the compound represented by the formula (V-c-3) is particularly preferred.

[Chem. 62]

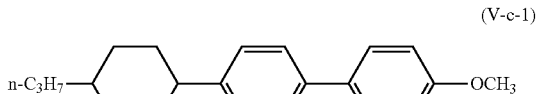
(V-c-1)

[Chem. 63]

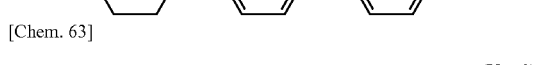
(V-c-2)

[Chem. 64]

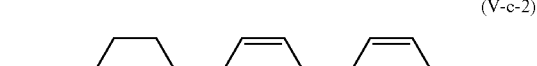
(V-c-3)

Further, the compound represented by the general formula (L) is preferably a compound selected from a compound group represented by, for example, general formula (VI).

[Chem. 65]

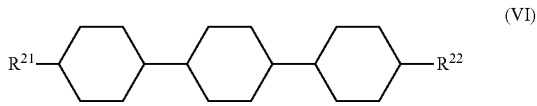
(VI)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of the compound represented by the general formula (VI) is preferably adjusted according to desired performance such as solubility at a low temperature, transition temperature, electric reliability, birefringence, or the like, and the content is preferably 4% by mass or more, more preferably 8% by mass or more, and still more preferably 12% by mass or more. The maximum allowable content is preferably 18% by mass or less, more preferably 12% by mass or less, and still more preferably 8% by mass or less.

Further, the range of the preferred content is preferably 4% by mass or more and 14% by mass or less and more preferably 8% by mass or more and 14% by mass or less.

Further, preferred examples of the compound represented by the general formula (VI) include compounds represented by formula (VI-1) and formula (VI-2).

[Chem. 66]

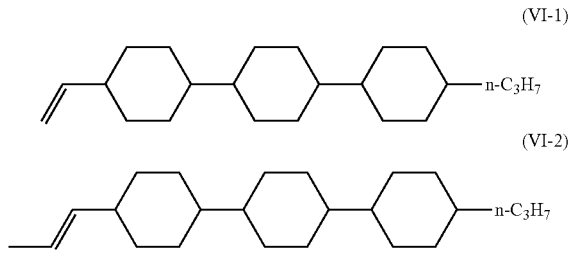

(VI-1)

(VI-2)

The content of the compound represented by the general formula (VI) is preferably adjusted according to desired performance such as solubility at a low temperature, transition temperature, electric reliability, birefringence, or the like, and the content is preferably 4% by mass or more, more preferably 8% by mass or more, and more preferably 12% by mass or more. The maximum allowable content is preferably 18% by mass or less and more preferably 14% by mass or less.

Further, the range of the preferred content is preferably 4% by mass or more and 14% by mass or less and more preferably 8% by mass or more and 14% by mass or less.

Further, the compound represented by the general formula (L) is preferably a compound selected from a compound group represented by, for example, general formula (VII).

[Chem. 67]

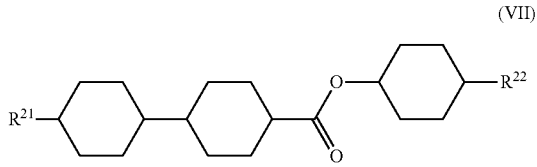

(VII)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The compounds may be contained alone or in combination of two or more, but are preferably used in proper combination according to desired performance. The types of compounds which can be combined are not particularly limited, and one or two of the compounds, particularly one to three of the compounds, are preferably contained according to desired performance such as solubility at a low temperature, transition temperature, electric reliability, birefringence, or the like.

The content of the compound represented by the general formula (VII) relative to the total amount of the liquid crystal composition of the present invention is preferably 1% by mass or more, more preferably 2% by mass or more, more preferably 3% by mass or more, more preferably 4% by mass or more, and particularly preferably 5% by mass or more. The maximum allowable content is preferably 10% by mass or less and more preferably 8% by mass or less.

Further, the range of the preferred content is preferably 1% by mass or more and 7% by mass or less and more preferably 2% by mass or more and 7% by mass or less.

Further, preferred examples of the compound represented by the general formula (VII) include compounds represented by formula (VII-1) to formula (VII-5), and the compounds represented by the formula (VII-2) or/and the compound (VII-5) are particularly preferred.

[Chem. 68]

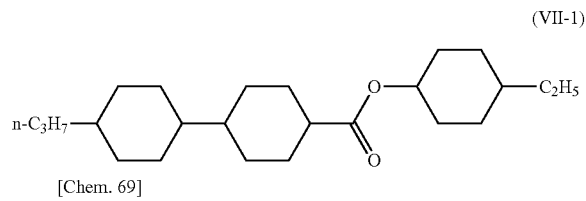

(VII-1)

[Chem. 69]

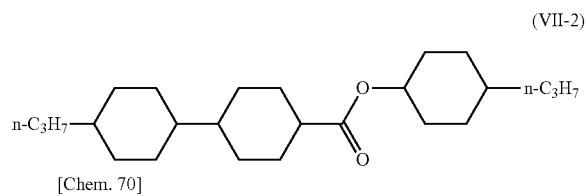

(VII-2)

[Chem. 70]

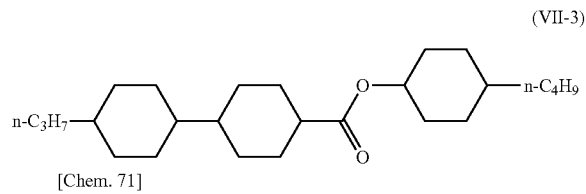

(VII-3)

[Chem. 71]

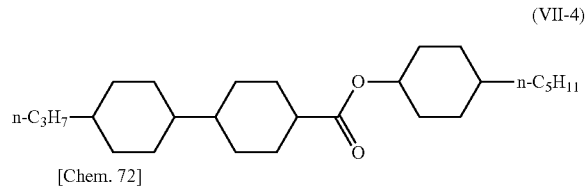

(VII-4)

[Chem. 72]

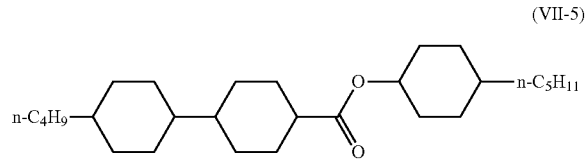

(VII-5)

Further, the compound represented by the general formula (L) is preferably a compound selected from a group represented by general formula (VIII).

[Chem. 73]

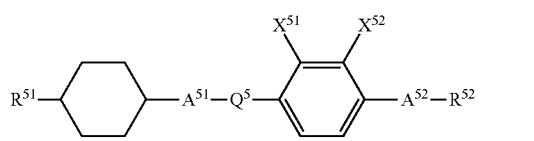

(VIII)

($R^{51}$ and $R^{52}$ each independently represent an alkyl group having 1 to 5 carbon atoms, an alkenyl group having 2 to 5 carbon atoms, or an alkoxy group having 1 to 4 carbon atoms, $A^{51}$ and $A^{52}$ each independently represent a 1,4-cyclohexylene group or a 1,4-phenylene group, $Q^5$ represents a single bond or —COO—, $X^{51}$ and $X^{52}$ each independently represent a fluorine atom or a hydrogen atom, and $X^{51}$ and $X^{52}$ are not simultaneously fluorine atoms.)

The types of compounds which can be combined are not particularly limited, but the compounds are used in combination according to desired performance such as solubility at a low temperature, transition temperature, electric reliability, birefringence etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4.

For example, according to an embodiment of the present invention, the lower limit of the preferred content relative to a total amount of the liquid crystal composition of the present invention is 2%. According to another embodiment of the present invention, the lower limit is 4%. According to still another embodiment of the present invention, the lower limit is 7%. According to a further embodiment of the present invention, the lower limit is 10%. According to a further embodiment of the present invention, the lower limit is 12%. According to a further embodiment of the present invention, the lower limit is 15%.

Also, for example, according to an embodiment of the present invention, the upper limit of the preferred content is 20%. According to another embodiment of the present invention, the upper limit is 15%. According to still another embodiment of the present invention, the upper limit is 10%. According to a further embodiment of the present invention, the upper limit is 5%. According to a further embodiment of the present invention, the upper limit is 4%.

For example, according to an embodiment of the present invention, the range of the preferred content relative to a total amount of the liquid crystal composition of the present invention is 2% to 15%. According to another embodiment of the present invention, the range is 4% to 12%. According to still another embodiment of the present invention, the range is 6% to 12%.

Further, the compound represented by the general formula (VIII) is preferably a compound represented by general formula (VIII-a).

[Chem. 74]

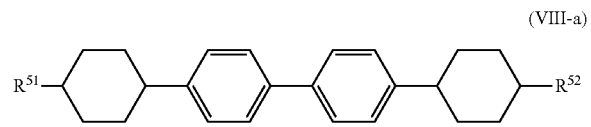

(VIII-a)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by the general formula (VIII-a) is preferably contained at a content of 1% by mass or more, more preferably 2% by mass or more, still more preferably 3% by mass or more, and particularly preferably 4% by mass or more relative to a total amount of the liquid crystal composition of the present invention. The maximum allowable content is preferably 15% by mass or less, more preferably 10% by mass or less, and still more preferably 8% by mass or less.

The range of the preferred content relative to a total amount of the liquid crystal composition of the present invention is preferably 1% by mass or more and 15% by mass or less, more preferably 2% by mass or more and 10% by mass or less, more preferably 3% by mass or more and 8% by mass or less, and particularly preferably 4% by mass or more and 8% by mass or less.

Further, preferred examples of the compound represented by the general formula (VIII-a) include compounds represented by formula (VIII-a-1) to formula (VIII-a-4), and the compound represented by the formula (VIII-a-2) is particularly preferred.

[Chem. 75]

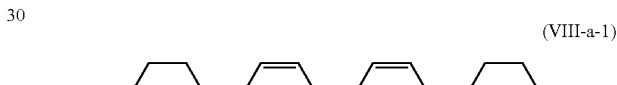

(VIII-a-1)

[Chem. 76]

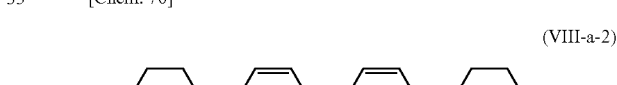

(VIII-a-2)

[Chem. 77]

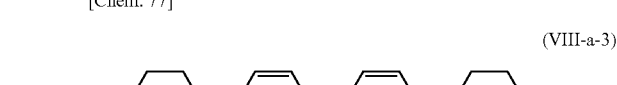

(VIII-a-3)

[Chem. 78]

(VIII-a-4)

Further, the compound represented by the general formula (VIII) is preferably a compound represented by general formula (VIII-b).

[Chem. 79]

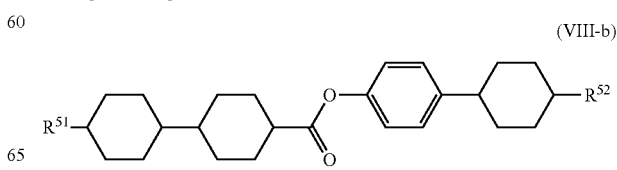

(VIII-b)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to a further embodiment of the present invention, the number of the types is 3 or more.

The compound represented by the general formula (VIII-b) is preferably contained at a content of 2% by mass or more, more preferably 4% by mass or more, still more preferably 7% by mass or more, and particularly preferably 8% by mass or more relative to a total amount of the liquid crystal composition of the present invention. The maximum allowable content is preferably 15% by mass or less, more preferably 13% by mass or less, and still more preferably 11% by mass or less.

The range of the preferred content is preferably 2% by mass or more and 15% by mass or less, more preferably 4% by mass or more and 15% by mass or less, and more preferably 7% by mass or more and 13% by mass or less.

Further, preferred examples of the compound represented by the general formula (VIII-b) include compounds represented by formula (VIII-b-1) to formula (VIII-b-3).

[Chem. 80]

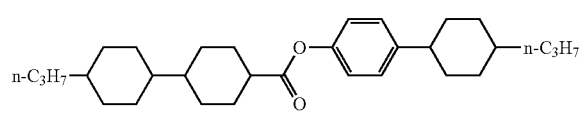

(VIII-b-1)

[Chem. 81]

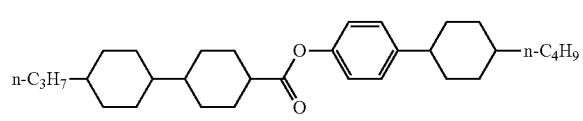

(VIII-b-2)

[Chem. 82]

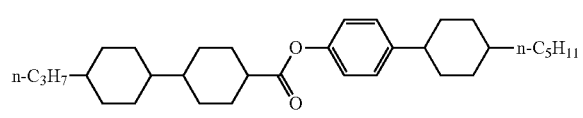

(VIII-b-3)

Further, the compound represented by the general formula (VIII) is preferably a compound represented by general formula (VIII-c).

[Chem. 83]

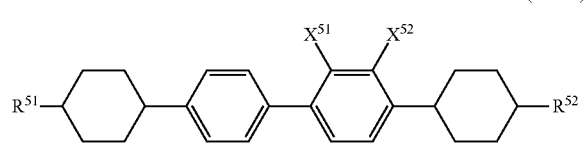

(VIII-c)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $X^{51}$ and $X^{52}$ each independently represent a fluorine atom or a hydrogen atom, at least one of $X^{51}$ and $X^{52}$ is a fluorine atom, and both of $X^{51}$ and $X^{52}$ are not simultaneously a fluorine atom.)

Further, the compound represented by the general formula (VIII-c) is preferably a compound represented by general formula (VIII-c-1).

[Chem. 84]

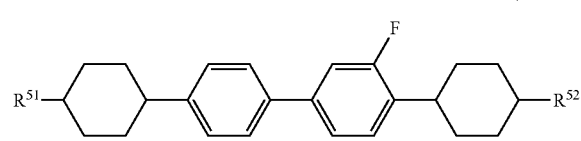

(VIII-c-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by the general formula (VIII-c-1) is preferably contained at a content of 1% by mass or more, more preferably 2% by mass or more, still more preferably 3% by mass or more, and particularly preferably 4% by mass or more relative to a total amount of the liquid crystal composition of the present invention. The maximum allowable content is preferably 10% by mass or less and more preferably 8% by mass or less.

The range of the preferred content is preferably 1% by mass or more and 10% by mass or less, more preferably 2% by mass or more and 8% by mass or less, and more preferably 3% by mass or more and 8% by mass or less.

Further, preferred examples of the compound represented by the general formula (VIII-c-1) include compounds represented by formula (VIII-c-1-1) to formula (VIII-c-1-3), and the compound represented by the formula (VIII-c-1-1) is particularly preferred.

[Chem. 85]

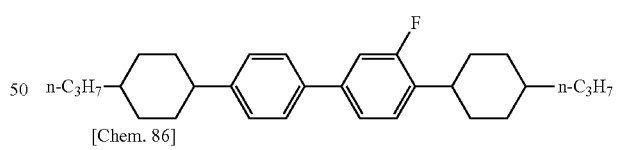

(VIII-c-1-1)

[Chem. 86]

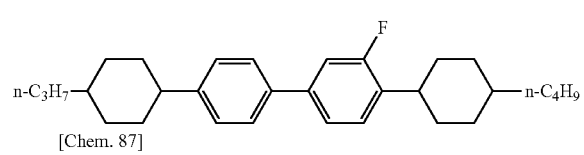

(VIII-c-1-2)

[Chem. 87]

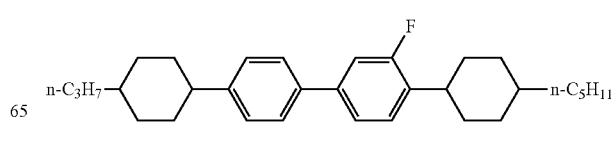

(VIII-c-1-3)

Further, the compound represented by the general formula (VIII-c) is preferably a compound represented by general formula (VIII-c-2).

[Chem. 88]

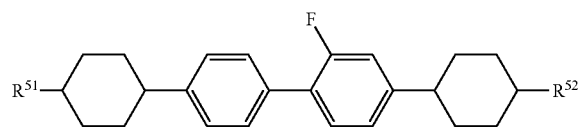
(VIII-c-2)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by the general formula (VIII-c-2) is preferably contained at a content of 1% by mass or more, more preferably 2% by mass or more, still more preferably 3% by mass or more, and particularly preferably 4% by mass or more relative to a total amount of the liquid crystal composition of the present invention. The maximum allowable content is preferably 10% by mass or less and more preferably 8% by mass or less.

The range of the preferred content is preferably 1% by mass or more and 10% by mass or less, more preferably 2% by mass or more and 8% by mass or less, and more preferably 3% by mass or more and 8% by mass or less.

Further, preferred examples of the compound represented by the general formula (VIII-c-2) include compounds represented by formula (VIII-c-2-1) to formula (VIII-c-2-3). The compound represented by the formula (VIII-c-2-1) is particularly preferred.

[Chem. 89]

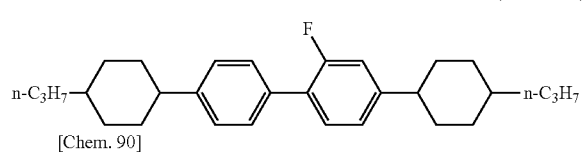
(VIII-c-2-1)

[Chem. 90]

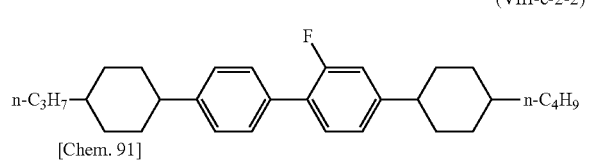
(VIII-c-2-2)

[Chem. 91]

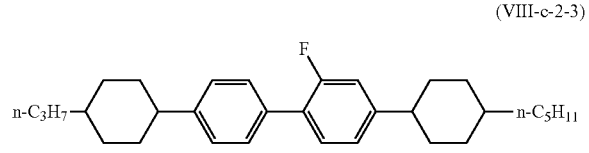
(VIII-c-2-3)

Further, the compound represented by the general formula (VIII) is preferably a compound represented by general formula (VIII-d).

[Chem. 92]

-continued

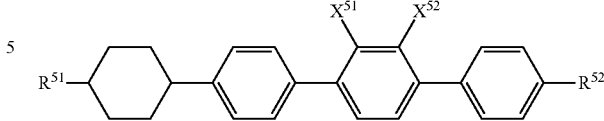
(VIII-d)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $X^{51}$ and $X^{52}$ each independently represent a fluorine atom or a hydrogen atom, and $X^{51}$ and $X^{52}$ are not simultaneously a fluorine atom.)

The types of compounds which can be combined are not particularly limited, but the compounds are used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2 or more.

For example, according to an embodiment of the present invention, the lower limit of the preferred content relative to a total amount of the liquid crystal composition of the present invention is 2%. According to another embodiment of the present invention, the lower limit is 4%. According to still another embodiment of the present invention, the lower limit is 7%. According to a further embodiment of the present invention, the lower limit is 10%. According to a further embodiment of the present invention, the lower limit is 12%.

Also, for example, according to an embodiment of the present invention, the upper limit of the preferred content is 15%. According to another embodiment of the present invention, the upper limit is 10%. According to still another embodiment of the present invention, the upper limit is 5%. According to a further embodiment of the present invention, the upper limit is 4%.

For example, according to an embodiment of the present invention, the range of the preferred content relative to a total amount of the liquid crystal composition of the present invention is 2% to 10%. According to another embodiment of the present invention, the range is 4% to 10%.

When an embodiment in which the liquid crystal composition of the present invention has high Tni is desired, the content of the compound represented by the formula (VIII-d) is preferably slightly increased, while when an embodiment in which the liquid crystal composition of the present invention has low viscosity is desired, the content is preferably slightly decreased.

Further, the compound represented by the general formula (VIII-d) is preferably a compound represented by general formula (VIII-d-1).

[Chem. 93]

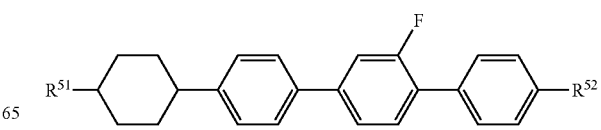
(VIII-d-1)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (VIII-d-1) include compounds represented by formula (VIII-d-1-1) to formula (VIII-d-1-4), and the compounds represented by the formula (VIII-d-1-1) or/and the formula (VIII-d-1-2) are particularly preferred.

[Chem. 94]

(VIII-d-1-1)

[Chem. 95]

(VIII-d-1-2)

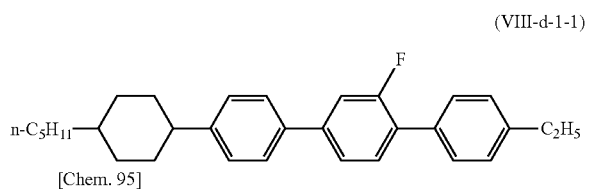

[Chem. 96]

(VIII-d-1-3)

[Chem. 97]

(VIII-d-1-4)

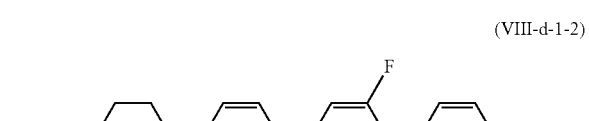

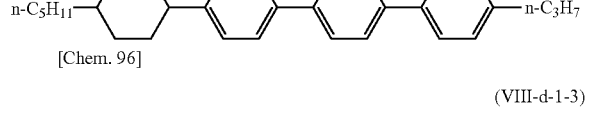

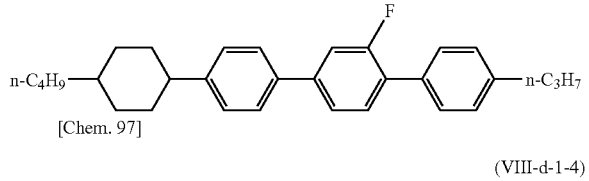

Further, the compound represented by the general formula (VIII-d) is preferably a compound represented by general formula (VIII-d-2).

[Chem. 98]

(VIII-d-2)

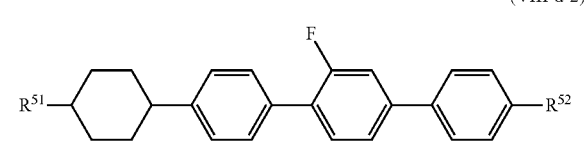

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Further, preferred examples of the compound represented by the general formula (VIII-d-2) include compounds represented by formula (VIII-d-2-1) to formula (VIII-d-2-4), and the compounds represented by the formula (VIII-d-2-1) or/and the formula (VIII-d-2-2) are particularly preferred.

[Chem. 99]

(VIII-d-2-1)

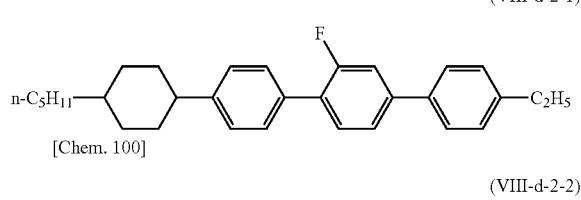

[Chem. 100]

(VIII-d-2-2)

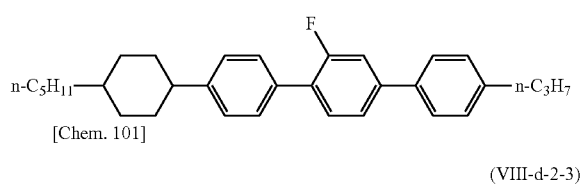

[Chem. 101]

(VIII-d-2-3)

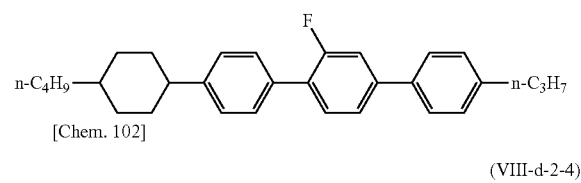

[Chem. 102]

(VIII-d-2-4)

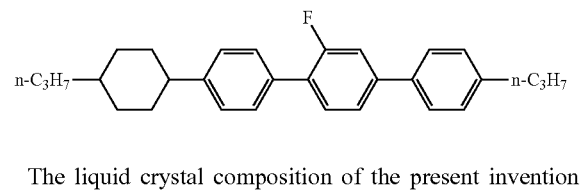

The liquid crystal composition of the present invention can further contain one or two or more compounds represented by general formula (IX-a).

[Chem. 103]

(IX-a)

(In the formula, $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.)

The types of compounds which can be combined are not particularly limited, but the compounds are used in combination according to desired performance such as solubility at a low temperature, transition temperature, electric reliability, birefringence, or the like. One to three of the compounds are preferably contained, one to four of the compounds are more preferably contained, and one to five or more of the compounds are particularly preferably contained. The maximum allowable content is preferably 30% by mass or less, more preferably 25% by mass or less, and still more preferably 15% by mass or less. The range of the preferred content is preferably 5% by mass or more and 35% by mass or less, more preferably 10% by mass or more and 20% by mass or less, and still more preferably 5% by mass or more and 15% by mass or less.

Specifically, compounds described below can be preferably used as the compound represented by the general formula (IX-a).

[Chem. 104]
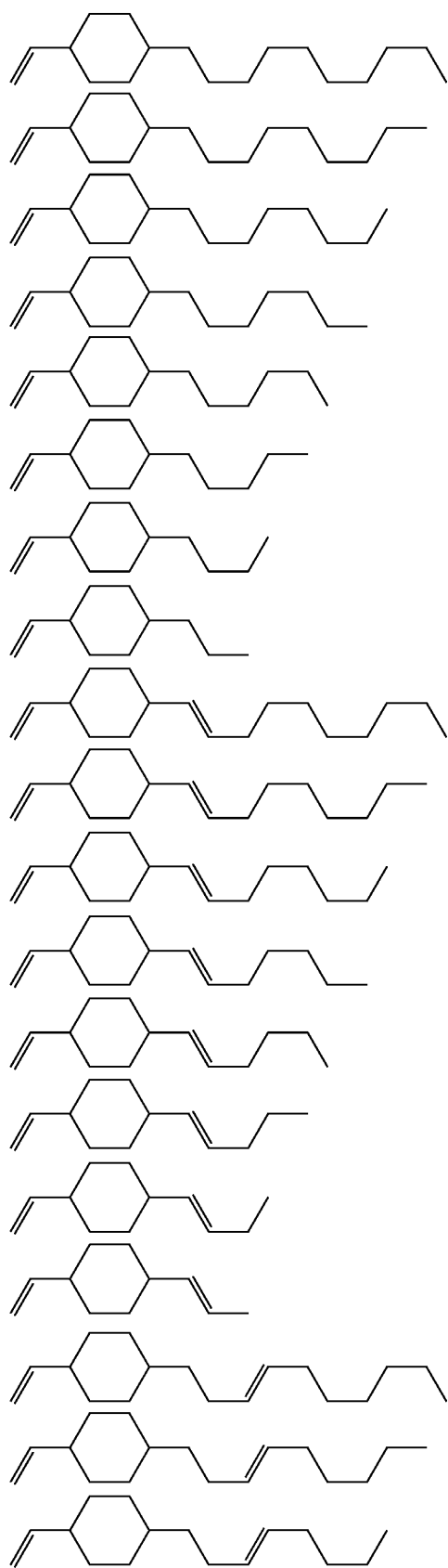
[Chem. 105]
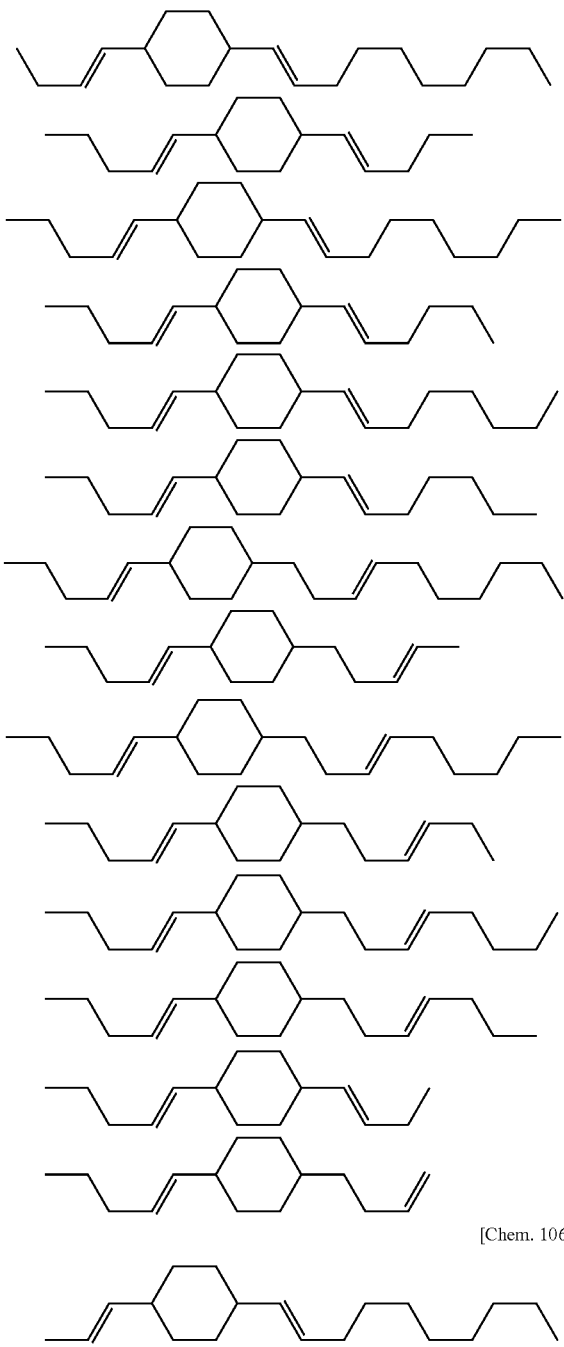
[Chem. 106]

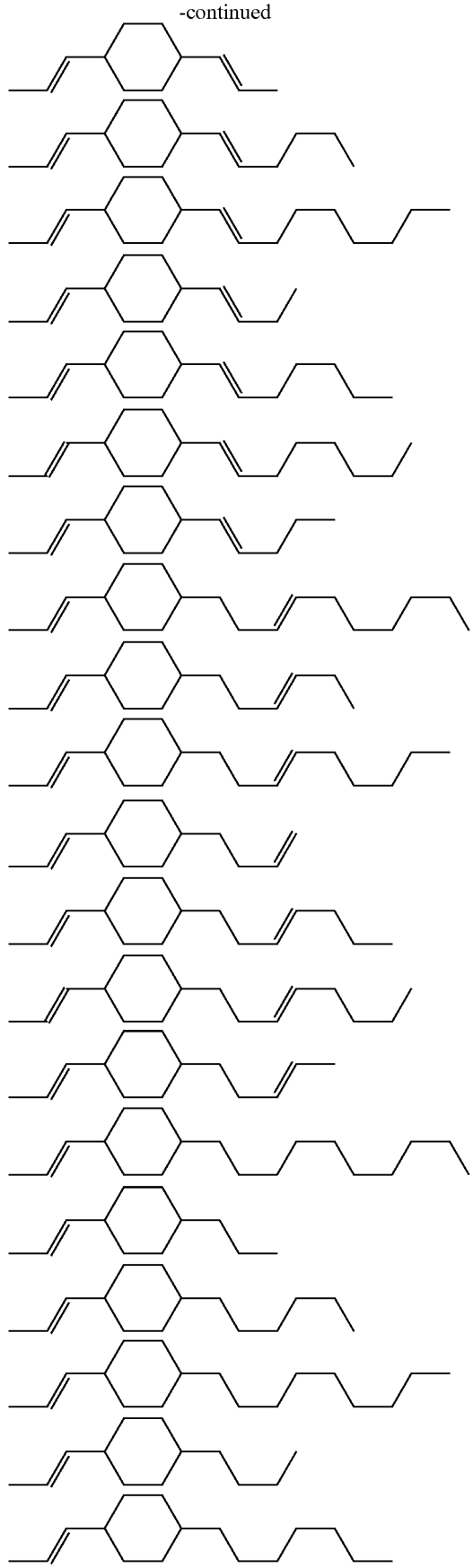
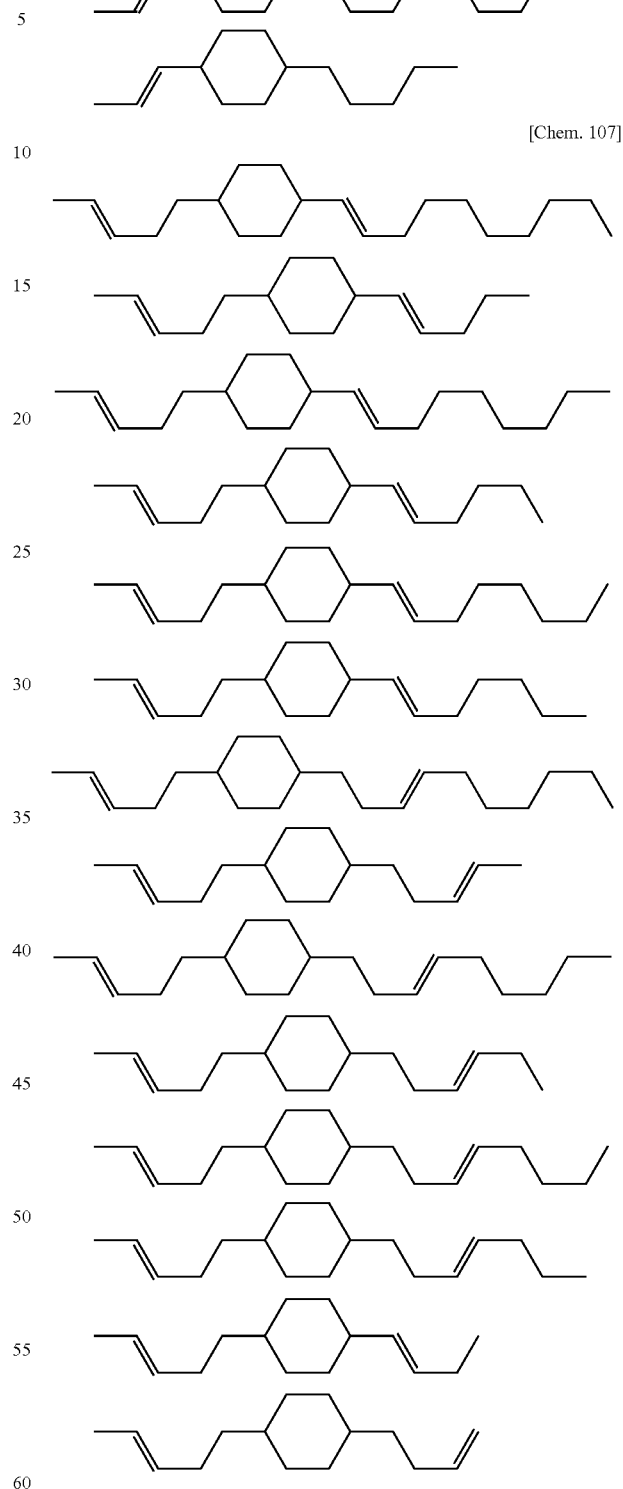
[Chem. 107]
The liquid crystal composition of the present invention can further contain one or two or more compounds represented by general formula (IX-b).

[Chem. 108]

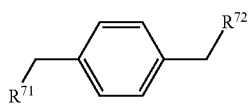

(IX-b)

(In the formula, $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.)

The types of compounds which can be combined are not particularly limited, but the compounds are used in combination according to desired performance such as solubility at a low temperature, transition temperature, electric reliability, birefringence, or the like. One to three of the compounds are preferably contained, one to four of the compounds are more preferably contained, and one to five or more of the compounds are particularly preferably contained. The maximum allowable content is preferably 30% by mass or less, more preferably 20% by mass or less, and still more preferably 15% by mass or less.

The range of the preferred content is preferably 5% by mass or more and 30% by mass or less, more preferably 10% by mass or more and 20% by mass or less, and still more preferably 5% by mass or more and 15% by mass or less.

Specifically, compounds described below can be preferably used as the compound represented by the general formula (IX-b).

[Chem. 109]

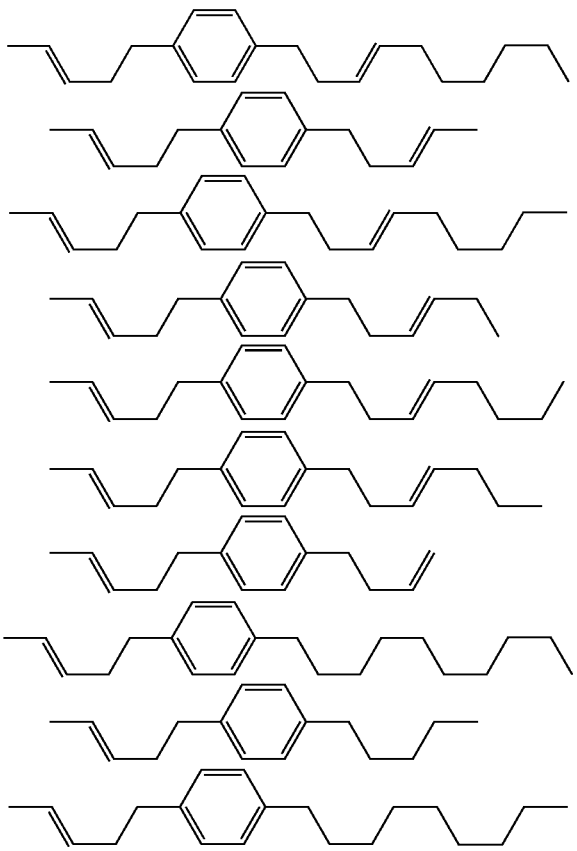

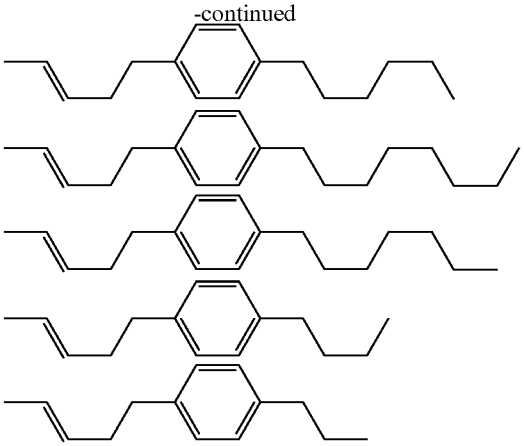

In the present invention, a 1,4-cyclohexyl group is preferably a trans-1,4-cyclohexyl group.

The liquid crystal composition of the present invention preferably contains one or two or more compounds selected from a group represented by general formula (X).

[Chem. 110]

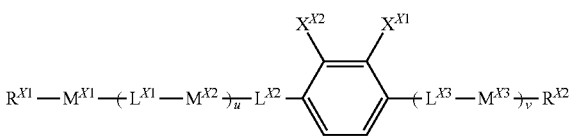

(X)

(In the formula, $R^{X1}$ and $R^{X2}$ each independently represent an alkyl group having 1 to 10 carbon atoms, an alkoxy group having 1 to 10 carbon atoms, or an alkenyl group having 2 to 10 carbon atoms; one methylene group or unadjacent two or more methylene groups present in these groups may be each independently substituted by —O— or —S—, and one or two or more hydrogen atoms present in these groups may be substituted by a fluorine atom or a chlorine atom;

u and v each independently represent 0, 1, or 2, and u +v is 2 or less;

$M^{X1}$, $M^{X2}$, and $M^{X3}$ each independently represent a group selected from the group consisting of (a) a trans-1,4-cyclohexylene group (one methylene group or two or more unadjacent methylene groups present in the group may be substituted by —O—or —S—), and (b) a 1,4-phenylene group (one —CH= or unadjacent two or more —CH= present in the group may be substituted by —N=);

hydrogen atoms contained in the groups (a) or the group (b) may be each independently substituted by a cyano group, a fluorine atom, a trifluoromethyl group, a trifluoromethoxy group, or a chlorine atom; when a plurality of at least one of $M^{X2}$ and/or $M^{X3}$ are present, these may be the same or different;

$L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—; and when a plurality of at least one of $L^{X1}$ and/or $L^{X3}$ are present, these may be the same or different;

$X^{X1}$ and $X^{X2}$ each independently represent a trifluoromethyl group, a trifluoromethoxy group, or a fluorine atom, and any one of $X^{31}$ and $X^{32}$ represents a fluorine atom.)

When a ring structure to which each of $R^{X1}$ and $R^{X2}$ is bonded is a phenyl group (aromatic), $R^{X1}$ and $R^{X2}$ are each preferably a linear alkyl group having 1 to 5 carbon atoms, a linear alkoxy group having 1 to 4 (or more) carbon atoms, or an alkenyl group having 4 to 5 carbon atoms, and when a ring structure to which each of $R^{X1}$ and $R^{X2}$ is bonded is a saturated ring structure such as cyclohexane, pyran, or dioxane, or the like, $R^{X1}$ and $R^{X2}$ are each preferably a linear alkyl group having 1 to 5 carbon atoms, a linear alkoxy group having 1 to 4 (or more) carbon atoms, or a linear alkenyl group having 2 to 5 carbon atoms.

When improvement of the response speed of a display device is regarded as important, an alkenyl group is preferred, while when reliability such as a voltage holding ratio or the like is regarded as important, an alkyl group is preferred. The alkenyl group preferably has any one of structures represented by formula (Alkenyl-1) to formula (Alkenyl-4) described below,

[Chem. 111]

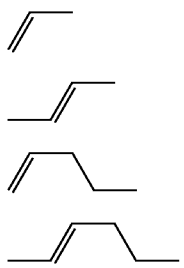

(Alkenyl-1)

(Alkenyl-2)

(Alkenyl-3)

(Alkenyl-4)

(in the formulae, the right end is bonded to a ring structure), and when the liquid crystal composition of the present invention contains a reactive monomer, the structures represented by the formula (Alkenyl-2) and the formula (Alkenyl-4) are preferred, and the structure represented by the formula (Alkenyl-2) is more preferred.

When the liquid crystal composition is required to have chemical stability, the compound represented by the general formula (X) preferably does not contain a sulfur atom, a nitrogen atom, an ester group, a cyano group, and a chlorine atom in its molecule.

The types of compounds which can be combined are not particularly limited, but the compounds are properly used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6. According to a further embodiment of the present invention, the number of the types is 7. According to a further embodiment of the present invention, the number of the types is 8. According to a further embodiment of the present invention, the number of the types is 9. According to a further embodiment of the present invention, the number of the types is 10 or more.

In the liquid crystal composition of the present invention, it is necessary to properly adjust the content of the compound represented by the general formula (X) according to desired performance such as solubility at a low temperature, transition temperature, electric reliability, birefringence, process adaptability, dropping marks, image sticking, dielectric anisotropy, or the like.

For example, according to another embodiment of the present invention, the lower limit of the preferred content relative to a total amount of the liquid crystal composition of the present invention is 15%. According to still another embodiment of the present invention, the lower limit is 25%. According to a further embodiment of the present invention, the lower limit is 30%. According to a further embodiment of the present invention, the lower limit is 40%. According to a further embodiment of the present invention, the lower limit is 45%.

Further, for example, according to another embodiment of the present invention, the upper limit of the preferred content relative to a total amount of the liquid crystal composition of the present invention is 75%. According to still another embodiment of the present invention, the upper limit is 65%. According to a further embodiment of the present invention, the upper limit is 55%. According to a further embodiment of the present invention, the upper limit is 50%.

For example, according to an embodiment of the present invention, the range of the preferred content relative to a total amount of the liquid crystal composition of the present invention is 10% to 65%. According to another embodiment of the present invention, the range is 15% to 60%. According to still another embodiment of the present invention, the range is 30% to 60%. According to a further embodiment of the present invention, the range is 40% to 55%.

When the viscosity of the liquid crystal composition of the present invention is kept low and the liquid crystal composition having a high response speed is required, both the lower limit and the upper limit are preferably high. Further, when Tni of the liquid crystal composition of the present invention is kept high and the liquid crystal composition having good temperature stability is required, both the lower limit and the upper limit are preferably high. In addition, when dielectric anisotropy is desired to be increased for keeping the drive voltage low, both the lower limit and the upper limit are preferably low.

The compound represented by the general formula (X) is preferably a compound represented by general formula (XI).

[Chem. 112]

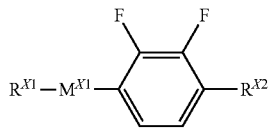

(XI)

(In the formula, $R^{X1}$ represents the same meaning as $R^{X1}$ in the general formula (X), $M^{X1}$ represents the same meaning as $M^{X1}$ in the general formula (X), and $R^{X2}$ represents the same meaning as $R^{X2}$ in the general formula (X).)

When the compound represented by the general formula (XI) is contained, for example, according to an embodiment of the present invention, the lower limit of the preferred content relative to a total amount of the liquid crystal composition of the present invention is 3%. According to another embodiment of the present invention, the lower limit is 7%. According to still another embodiment of the present invention, the lower limit is 10%. According to a further embodiment of the present invention, the lower limit is 11%. According to a further embodiment of the present invention, the lower limit is 14%. According to a further embodiment of the present invention, the lower limit is 20%. According to a further embodiment of the present invention, the lower limit is 30%.

Further, for example, according to an embodiment of the present invention, the upper limit of the preferred content relative to a total amount of the liquid crystal composition of the present invention is 55%. According to another embodiment of the present invention, the upper limit is 45%. According to still another embodiment of the present invention, the upper limit is 35%.

When the compound represented by the general formula (XI) is contained, the range of the preferred content is preferably 5% to 35% by mass, more preferably 7% to 25% by mass, still more preferably 11% to 21% by mass, and particularly preferably 13% to 16% by mass.

In the general formula (XI), $R^{X1}$ preferably represents an alkyl group having 1 to 8 carbon atoms or an alkenyl group having 2 to 8 carbon atoms, more preferably represents an alkyl group having 1 to 8 carbon atoms, more preferably represents an alkyl group having 3 to 5 carbon atoms, and still more preferably represents an alkyl group having 3 or 5 carbon atoms, and preferably linear.

In the general formula (XI), $R^{X2}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represents an alkyl group having 1 to 8 carbon atoms or an alkoxy group having 1 to 8 carbon atoms, more preferably represents an alkyl group having 3 to 5 carbon atoms or an alkoxy group having 2 to 4 carbon atoms, still more preferably represents an alkyl group having 3 or 5 carbon atoms or an alkoxy group having 2 or 4 carbon atoms, and still more preferably an alkoxy group having 2 or 4 carbon atoms, and preferably linear.

When improvement in the response speed of the display device is regarded as important, an alkenyl group is preferred, and when the reliability such as a voltage holding ratio or the like is regarded as important, an alkyl group is preferred.

The types of compounds which can be combined are not particularly limited, but the compounds are properly used in combination according to desired performance such as solubility at a low temperature, transition temperature, electric reliability, birefringence etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

The compound represented by the general formula (XI) may be used alone, but two or more compounds are preferably used, and three or more compounds are preferably used. When two or more compounds represented by the general formula (XI) are used, compounds of the general formula (XI) in which $R^{X1}$ represents an alkyl group having 3 to 5 carbon atoms and $R^{X2}$ represents an alkoxy group having 2 to 4 carbon atoms are preferably used in combination. When another compound represented by the general formula (XI) is combined, the content of the compounds of the general formula (XI) in which $R^{X1}$ represents an alkyl group having 3 to 5 carbon atoms and $R^{X2}$ represents an alkoxy group having 2 to 4 carbon atoms in compounds represented by the general formula (XI) is preferably 50% by mass or more, more preferably 70% by mass or more, and still more preferably 80% by mass or more. The preferred range is preferably 50% by mass or more and 70% by mass or less, more preferably 70% by mass or more and 80% by mass or less, and still more preferably 80% by mass or more and 100% by mass or less.

In the general formula (XI), $M^{X1}$ represents a 1,4-cyclohexylene group, a 1,4-phenylene group, or a tetrahydropyran-2,5-diyl group, and when $M^{X1}$ represents a 1,4-phenylene group, one or more hydrogen atoms in the 1,4-phenylene group may be substituted by fluorine atoms, and a 1,4-cyclohexylene group or a 1,4-phenylene group is preferred. More specifically, when the response speed is regarded as important for a display device and a liquid crystal display manufactured by using the liquid crystal composition of the present invention, $M^{X1}$ preferably represents a 1,4-phenylene group, while when an operation temperature range is regarded as important, that is, when a high operation temperature range (high $T_{ni}$) is required, $M^{X1}$ preferably represents a 1,4-cyclohexylene group. Although, when $M^{X1}$ represents a 1,4-phenylene group, one or more hydrogen atoms in a benzene ring may be substituted by fluorine atoms, an unsubstituted, mono-substituted, or di-substituted 1,4-phenylene group is preferred, and an unsubstituted group is more preferred. A di-substituted 1,4-phenylene group is preferably a 2,3-difluoro-1,4-phenylene group.

Specifically, the compound represented by the general formula (XI) is preferably a compound selected from a group represented by general formula (XI-1) and/or general formula (XI-2) described below.

[Chem. 113]

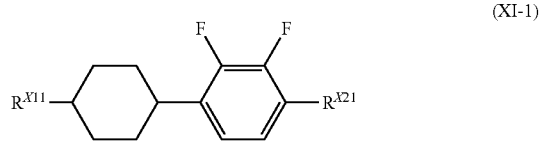

(XI-1)

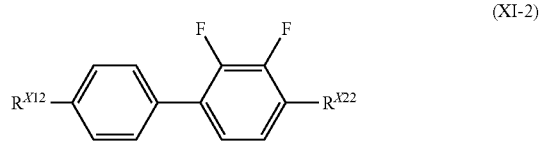

(XI-2)

(In the formulae, $R^{X11}$, $R^{X21}$, $R^{X12}$, and $R^{X22}$ each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms.)

When $R^{X21}$, $R^{X12}$, and $R^{X22}$ are each an alkenyl group, the number of carbon atoms is preferably 4 to 5. $R^{X11}$ is preferably an alkyl group or an alkenyl group and more preferably an alkyl group, and $R^{X21}$ and $R^{X22}$ are each preferably an alkyl group or an alkoxy group. When an absolute value of Δ∈ is increased, an alkoxy group or an alkenyloxy group is preferred, and an alkoxy group is more preferred. $R^{X12}$ is preferably an alkyl group or an alkenyl group and more preferably an alkyl group.

Preferred examples of the compound represented by the general formula (XI) include compounds represented by formula (XI-1-1) to formula (XI-2-4) described below.

[Chem. 114]

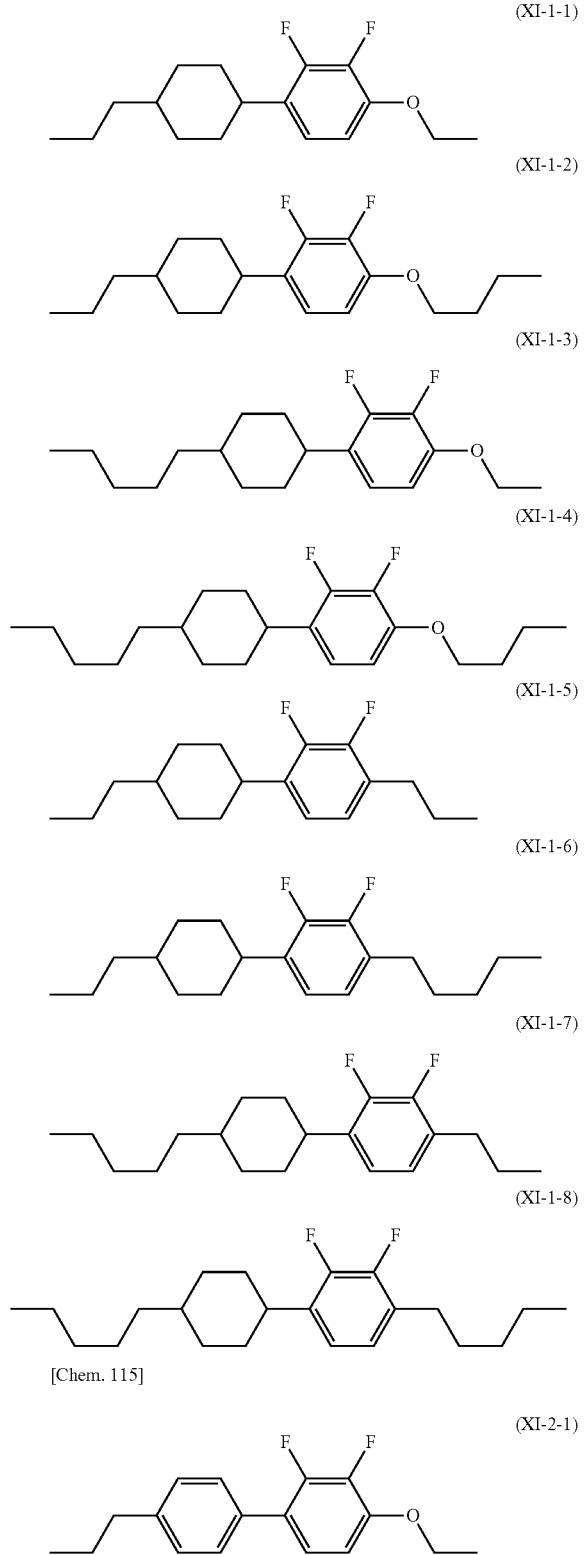

[Chem. 115]

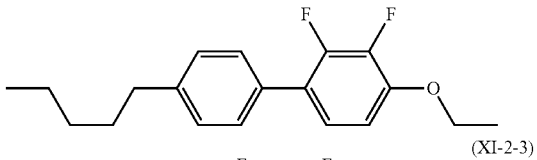

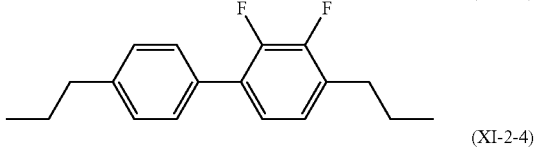

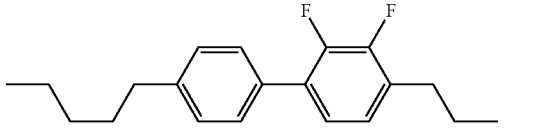

Compounds represented by the formula (XI-1-1) to the formula (XI-1-4), the formula (XI-2-1), and the formula (XI-2-2) are more preferred, compounds represented by the formula (XI-1-1), the formula (XI-1-3), the formula (XI-2-1), and the formula (XI-2-2) are still more preferred, and compounds represented by the formula (XI-1-1), the formula (XI-1-3), and the formula (XI-2-1) are particularly preferred. More specifically, when the value of refractive index anisotropy Δn required for the liquid crystal composition of the present invention is relatively low (about less than 0.100), the compounds represented by the formula (XI-1-1) and the formula (XI-1-3) are most preferred, while when the required value of refractive index anisotropy Δn is relatively high (about less 0.100 or more), the compound represented by the formula (XI-2-1) is most preferred.

Specifically, when the compound represented by the general formula (XI) has an alkenyl group, the compound is preferably a compound selected from a group represented by formula (XI-1-10) to formula (XI-2-11) described below.

[Chem. 116]

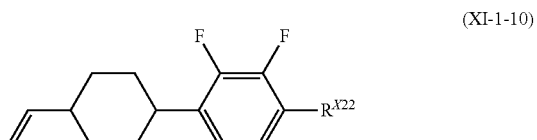

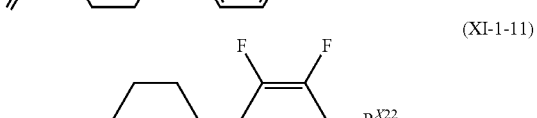

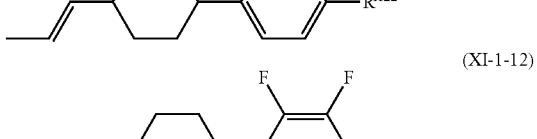

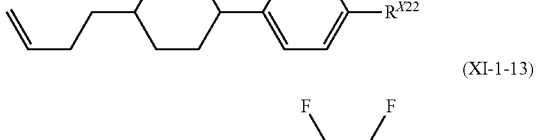

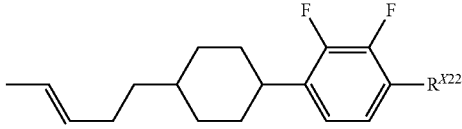

[Chem. 117]

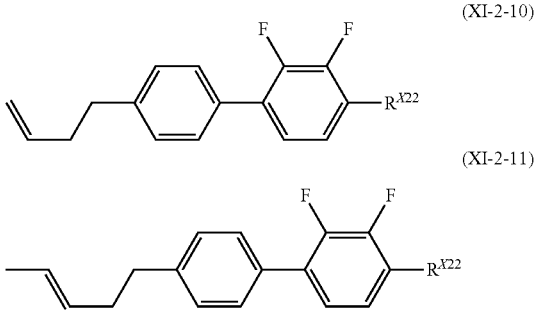

(In the formulae, $R^{X22}$ represents the same meaning as $R^{X22}$ in the general formula (XI-2).)

Further, the compound represented by the general formula (X) is preferably a compound represented by the general formula (XII).

[Chem. 118]

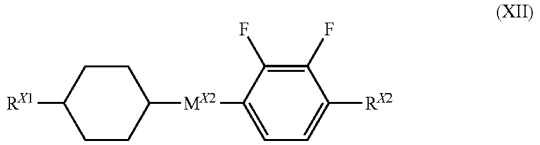

(In the formula, $R^{X1}$ represents the same meaning as $R^{X1}$ in the general formula (X), $M^{X2}$ represents the same meaning as $M^{X2}$ in the general formula (X), and $R^{X2}$ represents the same meaning as $R^{X2}$ in the general formula (X).)

When the compound represented by the general formula (XII) is contained, for example, according to another embodiment of the present invention, the lower limit of the preferred content relative to a total amount of the liquid crystal composition of the present invention is 5%. According to still another embodiment of the present invention, the lower limit is 10%. According to a further embodiment of the present invention, the lower limit is 15%. According to a further embodiment of the present invention, the lower limit is 20%. According to a further embodiment of the present invention, the lower limit is 30%.

Also, for example, according to another embodiment of the present invention, the upper limit of the preferred content relative to a total amount of the liquid crystal composition of the present invention is 55%. According to still another embodiment of the present invention, the upper limit is 45%. According to a further embodiment of the present invention, the upper limit is 35%.

Further, for example, according to an embodiment of the present invention, the range of the preferred content relative to a total amount of the liquid crystal composition of the present invention is 5% to 55%. According to another embodiment of the present invention, the range is 5% to 50%. According to still another embodiment of the present invention, the range is 10% to 45%. According to still another embodiment of the present invention, the range is 15% to 40%. According to a further embodiment of the present invention, the range is 20% to 40%. According to a further embodiment of the present invention, the range is 25% to 40%.

In the general formula (XII), $R^{X1}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkenyl group having 2 to 8 carbon atoms, more preferably represents an alkyl group having 1 to 8 carbon atoms, still more preferably represents an alkyl group having 2 to 5 carbon atoms, and particularly preferably represents an alkyl group having 3 to 5 carbon atoms, and preferably linear.

In the general formula (XII), $R^{X2}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkoxy group having 1 to 8 carbon atoms, more preferably represents an alkyl group having 1 to 5 carbon atoms or an alkoxy group having 1 to 4 carbon atoms, still more preferably represents an alkoxy group having 1 to 4 carbon atoms, and particularly preferably an alkoxy group having 2 or 3 carbon atoms, and preferably linear.

When improvement in the response speed of the display device is regarded as important, an alkenyl group is preferred, and when the reliability such as a voltage holding ratio or the like is regarded as important, an alkyl group is preferred.

Further, preferred examples of the compound represented by the general formula (XII) include compounds represented by general formula (XII-1) and general formula (XII-2).

[Chem. 119]

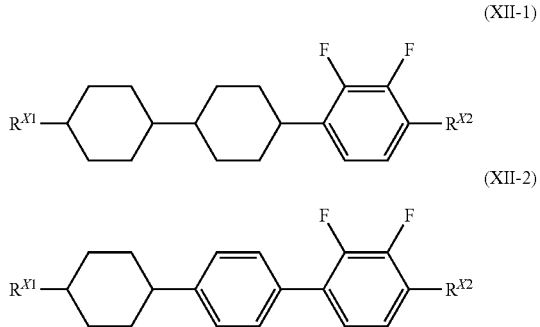

(In the formulae, $R^{X1}$ represents the same meaning as $R^{X1}$ in the general formula (X), and $R^{X2}$ represents the same meaning as $R^{X2}$ in the general formula (X).)

Preferred examples of the compound represented by the general formula (XII-1) include compounds represented by formula (XII-1-1) to formula (XII-1-6) described below.

[Chem. 120]

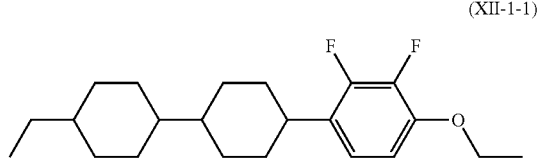

-continued

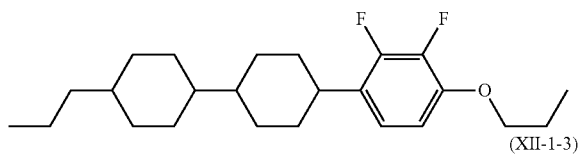
(XII-1-2)

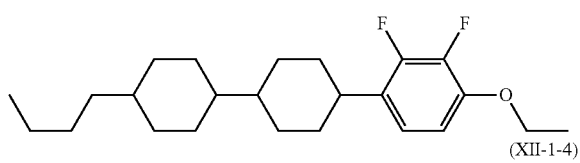
(XII-1-3)

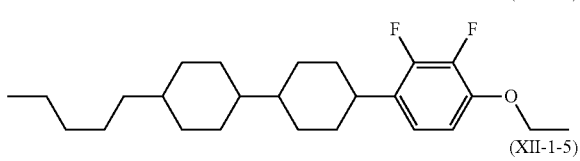
(XII-1-4)

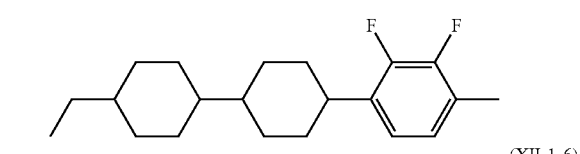
(XII-1-5)

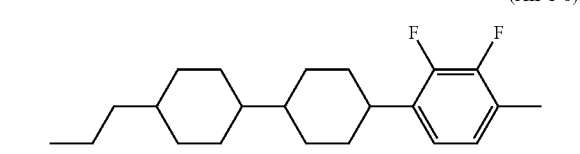
(XII-1-6)

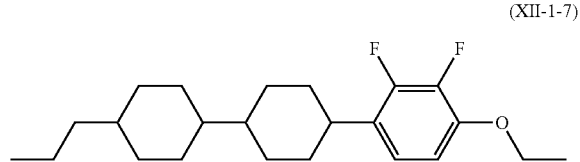
(XII-1-7)

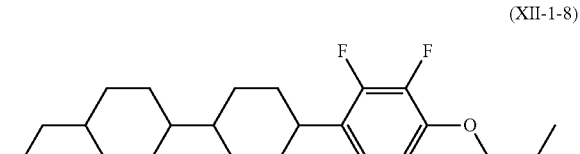
(XII-1-8)

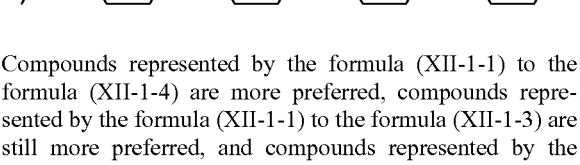
(XII-1-9)

Compounds represented by the formula (XII-1-1) to the formula (XII-1-4) are more preferred, compounds represented by the formula (XII-1-1) to the formula (XII-1-3) are still more preferred, and compounds represented by the formula (XII-1-1) and the formula (XII-1-3) are particularly preferred.

Specifically, when the compound represented by the general formula (XII-1) has an alkenyl group, compounds represented by formula (XII-1-10) to the formula (XII-1-13) are preferred.

[Chem. 121]

(XII-1-10)

-continued

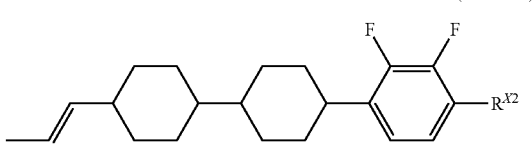
(XII-1-11)

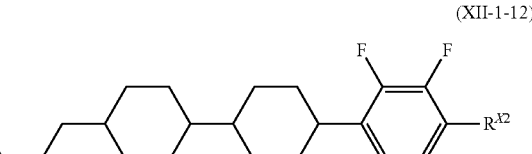
(XII-1-12)

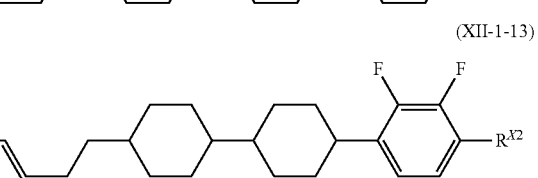
(XII-1-13)

(In the formulae, $R^{X2}$ represents the same meaning as $R^{X2}$ in the general formula (X).)

Preferred examples of the compound represented by the general formula (XII-2) include compounds represented by formula (XII-2-1) to formula (XII-2-6) described below.

[Chem. 122]

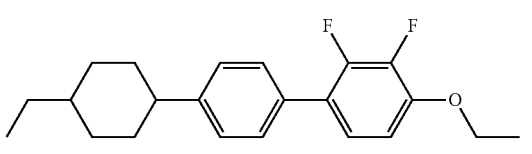
(XII-2-1)

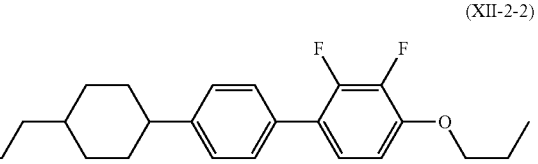
(XII-2-2)

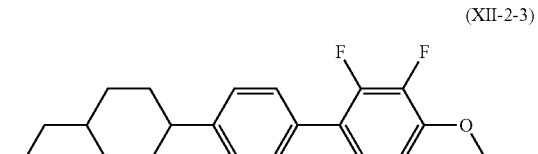
(XII-2-3)

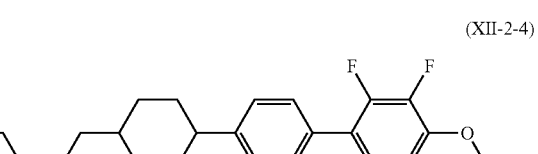
(XII-2-4)

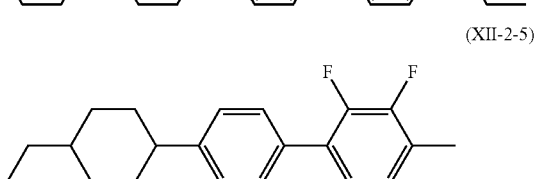
(XII-2-5)

-continued (XII-2-6)

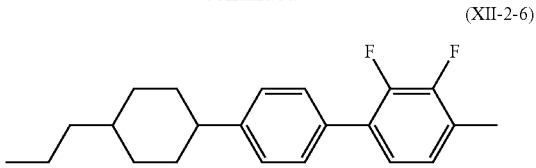

Compounds represented by the formula (XII-2-1) to the formula (XII-2-4) are more preferred, compounds represented by the formula (XII-2-1) to the formula (XII-2-3) are still more preferred, and compounds represented by the formula (XII-2-1) and the formula (XII-2-3) are particularly preferred.

Specifically, when the compound represented by the general formula (XII-2) has an alkenyl group, compounds represented by formula (XII-2-10) to the formula (XII-2-13) described below are preferred.

[Chem. 123]

(XII-2-10)

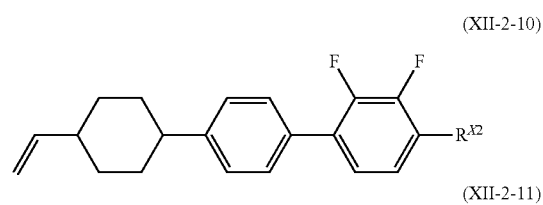

(XII-2-11)

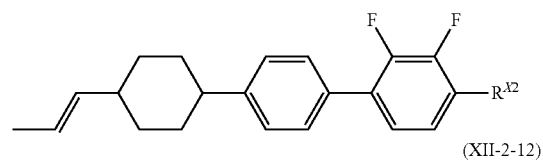

(XII-2-12)

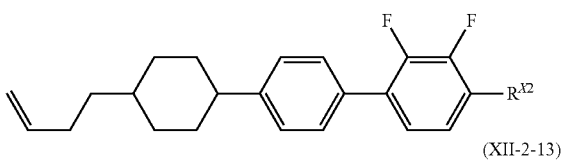

(XII-2-13)

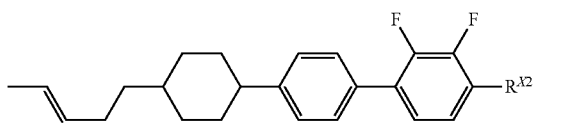

(In the formulae, $R^{X2}$ represents the same meaning as $R^{X2}$ in the general formula (X).)

The types of compounds which can be combined are not particularly limited, but the compounds are properly used in combination according to desired performance such as solubility at a low temperature, transition temperature, electric reliability, birefringence etc. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5. According to a further embodiment of the present invention, the number of the types is 6 or more.

When four or more compounds represented by the general formula (XII) are used, compounds represented by the formula (XII-2-1) to the formula (XII-2-4) are preferably used in combination, and the content of the compounds represented by the formula (XII-2-1) to the formula (XII-2-4) in compounds represented by the general formula (XII) is preferably 40% by mass or more and more preferably 50% by mass or more. The range of the preferred content is preferably 40% by mass or more and 70% by mass or less.

When three compounds represented by the general formula (XII) are used, compounds represented by the formula (XII-2-1) to the formula (XII-2-3) are preferably used in combination, and the content of the compounds represented by the formula (XII-2-1) to the formula (XII-2-3) in compounds represented by the general formula (XII) is preferably 40% by mass or more and more preferably 50% by mass or more. The range of the preferred content is preferably 40% by mass or more and 70% by mass or less and more preferably 50% by mass or more and 70% by mass or less.

When two compounds represented by the general formula (XII) are used, compounds represented by the formula (XII-2-1) and the formula (XII-2-2) are preferably used in combination, and the content of the compounds represented by the formula (XII-2-1) and the formula (XII-2-2) in compounds represented by the general formula (XII) is preferably 40% by mass or more and more preferably 50% by mass or more.

The range of the preferred content is preferably 40% by mass or more and 70% by mass or less and more preferably 50% by mass or more and 80% by mass or less.

Further, the compound represented by the general formula (X) is preferably a compound represented by general formula (XIII).

[Chem. 124]

(XIII)

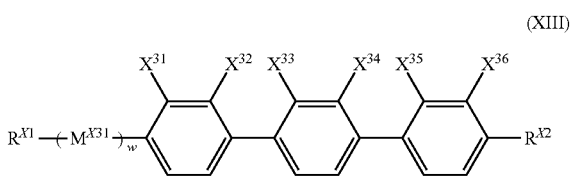

(In the formula, $R^{X1}$ represents the same meaning as $R^{X1}$ in the general formula (X), $M^{X31}$ represents the same meaning as $M^{X1}$ in the general formula (X), $R^{X2}$ represents the same meaning as $R^{X2}$ in the general formula (X), W represents 0 or 1, $X^{31}$ to $X^{36}$ each independently represent a hydrogen atom or a fluorine atom, and at least one combination of a combination of $X^{31}$ and $X^{32}$, a combination of $X^{33}$ and $X^{34}$, a combination of $X^{35}$ and $X^{36}$ are both fluorine atoms, wherein the compound the formula (XIII-1-2) or the formula (XIII-1-4) is excluded.)

The types of compounds which can be combined are not particularly limited, but the compounds are properly used in combination according to desired performance such as solubility at a low temperature, transition temperature, electric reliability, birefringence, or the like. For example, according to an embodiment of the present invention, the number of the type of compound used is 1. According to another embodiment of the present invention, the number of the types is 2. According to still another embodiment of the present invention, the number of the types is 3. According to a further embodiment of the present invention, the number of the types is 4. According to a further embodiment of the present invention, the number of the types is 5 or more.

When the compound represented by the general formula (XIII) is contained and a lower limit is present, for example, according to an embodiment of the present invention, the lower limit of the preferred content relative to a total amount of the liquid crystal composition of the present invention is 1%. According to another embodiment of the present invention, the lower limit is 3%. According to still another embodiment of the present invention, the lower limit is 5%. According to a further embodiment of the present invention, the lower limit is 8%. According to a further embodiment of the present invention, the lower limit is 10%. On the other hand, according to an embodiment, a lower limit is absent, that is, the content is 0%.

Also, for example, according to an embodiment of the present invention, the upper limit of the preferred content relative to a total amount of the liquid crystal composition of the present invention is 28%. According to another embodiment of the present invention, the upper limit is 20%. According to a further embodiment of the present invention, the upper limit is 15%.

For example, according to an embodiment of the present invention, the range of the preferred content relative to a total amount of the liquid crystal composition of the present invention is 1% to 25%. According to another embodiment of the present invention, the range is 3% to 20%. According to still another embodiment of the present invention, the range is 5% to 15%.

In the general formula (XIII), $R^{X1}$ and $R^{X2}$ each independently preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represent an alkyl group having 1 to 8 carbon atoms or an alkenyl group having 2 to 8 carbon atoms, more preferably represent an alkyl group having 1 to 8 carbon atoms, still more preferably represent an alkyl group having 2 to 5 carbon atoms, and particularly preferably represent an alkyl group having 3 to 5 carbon atoms, and $R^1$ and $R^2$ most preferably have different numbers of carbon atoms and are preferably linear.

In the general formula (XIII), $X^{31}$ to $X^{36}$ each independently preferably represent a hydrogen atom or a fluorine atom, two to five of $X^{31}$ to $X^{36}$ preferably represent fluorine atoms, two to four of $X^{31}$ to $X^{36}$ more preferably represent fluorine atoms, two to three of $X^{31}$ to $X^{36}$ more preferably represent fluorine atoms, and two of $X^{31}$ to $X^{36}$ still more preferably represent fluorine atoms.

In this case, when two fluorine atoms are present, any two of $X^{33}$ to $X^{36}$ preferably represent fluorine atoms, both of $X^{33}$ and $X^{34}$ or $X^{35}$ and $X^{36}$ preferably represent fluorine atoms, and both of $X^{33}$ and $X^{34}$ more preferably represent fluorine atoms. When three fluorine atoms are present, both of at least $X^{33}$ and $X^{34}$ preferably represent fluorine atoms or both of at least $X^{35}$ and $X^{36}$ preferably represent fluorine atoms, and both of at least $X^{33}$ and $X^{34}$ more preferably represent fluorine atoms.

In the general formula (XIII), $M^{X31}$ preferably represents a 1,4-cyclohexylene group, a 1,4-phenylene group, or a tetrahydropyran-2,5-diyl group, and when the response speed is regarded as important for a display device and a liquid crystal display manufactured by using the liquid crystal composition of the present invention, $M^{X31}$ preferably represents a 1,4-phenylene group or a tetrahydropyran-2,5-diyl group and more preferably represents a 1,4-phenylene group. When the drive voltage is regarded as important, $M^{X31}$ preferably represents a 1,4-phenylene group or a tetrahydropyran-2,5-diyl group and more preferably represents a tetrahydropyran-2,5-diyl group. When an operation temperature range is regarded as important, that is, when a high operation temperature range is required, $M^{X31}$ preferably represents a 1,4-cyclohexylene group or a tetrahydropyran-2,5-diyl group and more preferably represents a 1,4-cyclhexylene group. Although, when $M^{X31}$ represents a 1,4-phenylene group, one or more hydrogen atoms in a benzene ring may be substituted by fluorine atoms, an unsubstituted, mono-substituted, or di-substituted 1,4-phenylene group is preferred. A di-substituted 1,4-phenylene group is preferably a 2,3-difluorobenzene-1,4-dily group.

In the general formula (XIII), W represents 0 or 1, and when the response speed is regarded as important, W preferably represents 0, while when an operation temperature range is regarded as important, that is, when a high operation temperature range is required, W preferably represents 1.

Preferred examples of the compound represented by the general formula (XIII) include compounds represented by general formula (XIII-1) to general formula (XIII-43) described below.

[Chem. 125]

(XIII-1)

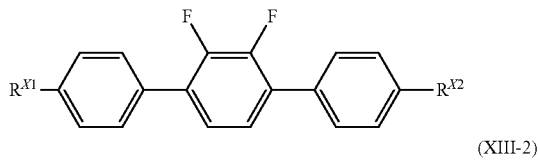
(XIII-2)

(XIII-3)

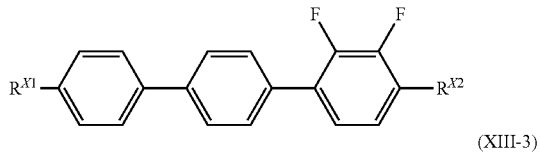
(XIII-4)

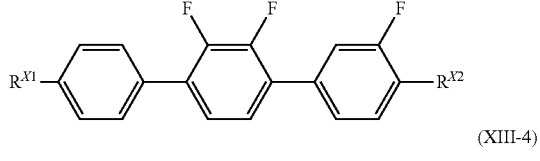
(XIII-5)

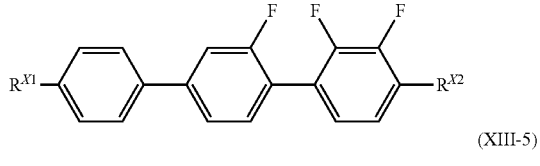

[Chem. 126]

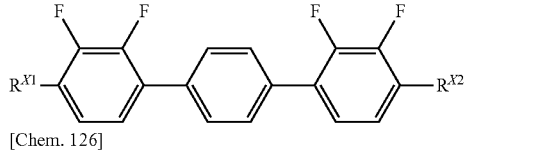
(XIII-10)

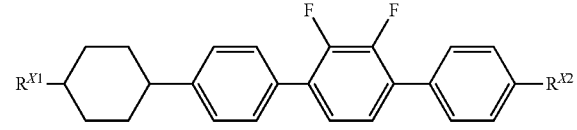

(XIII-11)

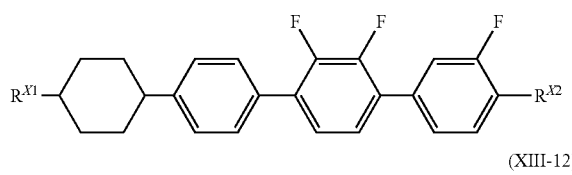

(XIII-12)

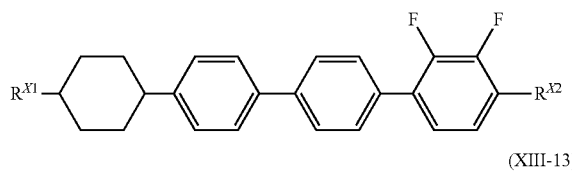

(XIII-13)

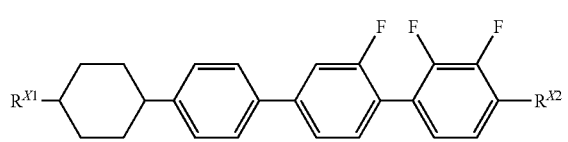

[Chem. 127]

(XIII-20)

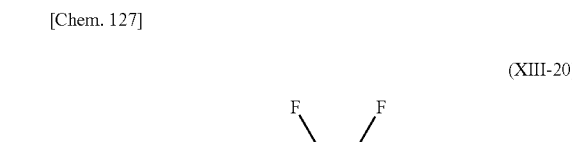

(XIII-21)

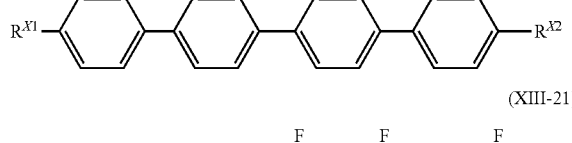

(XIII-22)

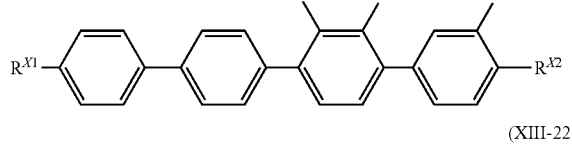

(XIII-23)

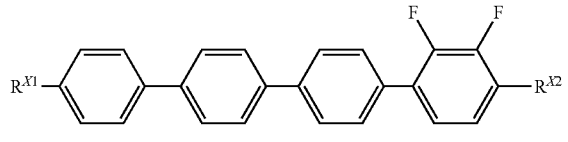

[Chem. 128]

(XIII-40)

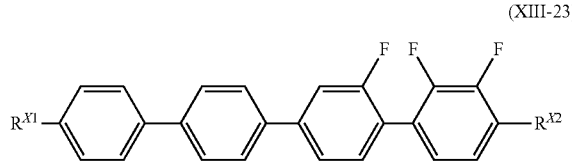

(XIII-41)

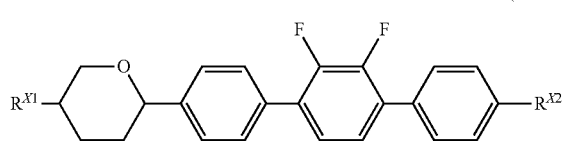

(XIII-42)

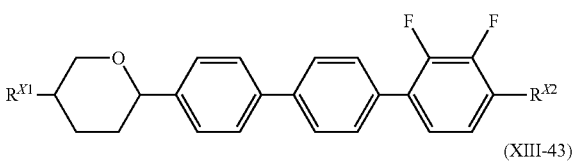

(XIII-43)

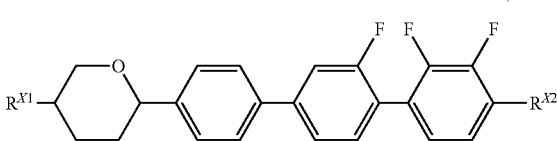

(In the formulae, $R^{X1}$ represents the same meaning as $R^{X1}$ in the general formula (X), and $R^{X2}$ represents the same meaning as $R^{X2}$ in the general formula (X).) Compounds represented by the general formulae (XIII-1) to (XIII-10), (XIII-12), (XIII-20), (XIII-22), (XIII-40), and (XIII-42) are preferred, compounds represented by the general formulae (XIII-1), (XIII-2), (XIII-10), (XIII-12), (XIII-20), (XIII-22), (XIII-40), and (XIII-42) are preferred, compounds represented by the general formulae (XIII-1) and (XIII-2) are preferred, and the compound represented by the general formulae (XIII-1) is more preferred.

Preferred examples of the compound represented by the general formula (XIII-1) include compounds represented by formula (XIII-1-1) to formula (XIII-1-16) described below.

[Chem. 129]

(XII-1-1)

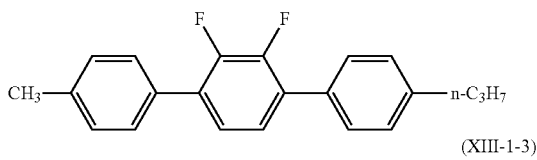

(XIII-1-3)

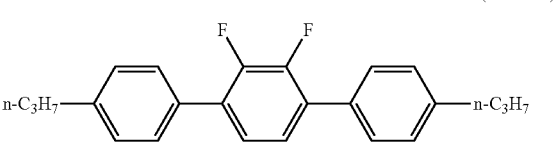

(XIII-1-5)

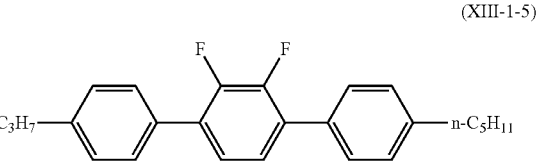

(XIII-1-6)

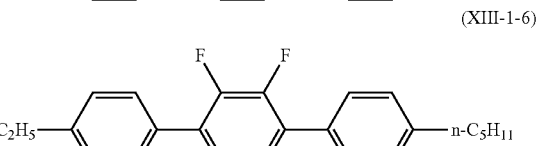

[Chem. 130]

(XIII-1-10)

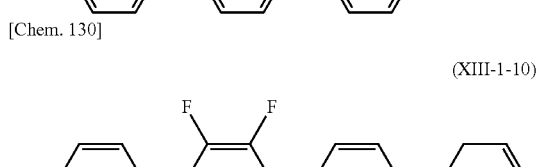

-continued (XIII-1-11)
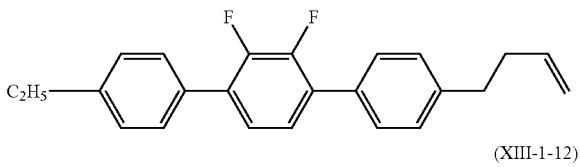

(XIII-1-12)
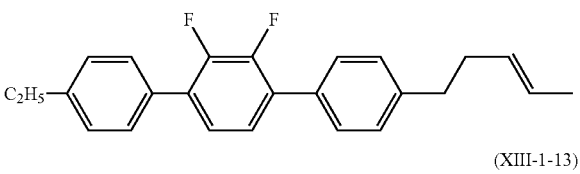

(XIII-1-13)
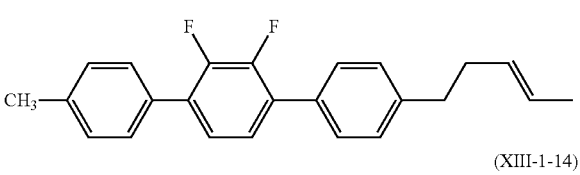

(XIII-1-14)
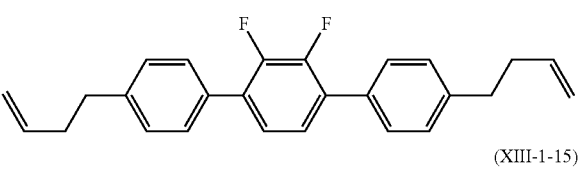

(XIII-1-15)
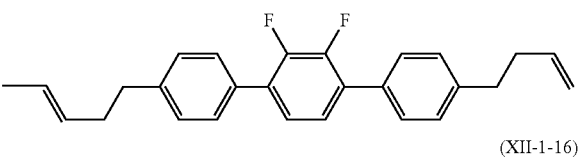

(XII-1-16)
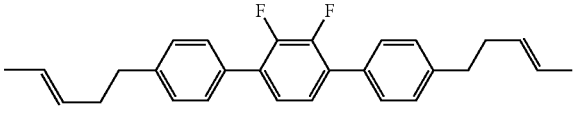

Among the compounds described above, compounds represented by the formula (XIII-1-1) to the formula (XIII-1-6) are preferred, and the compound represented by the formula (XIII-1-1) is preferred.

In the general formula (XIII), $R^{X1}$ and $R^{X2}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represent an alkyl group having 1 to 8 carbon atoms or an alkenyl group having 2 to 8 carbon atoms, more preferably represent an alkyl group having 2 to 5 carbon atoms or an alkenyl group having 2 to 5 carbon atoms, and still more preferably represent an alkyl group having 2 to 5 carbon atoms, and a linear group is preferred. When $R^{X1}$ and $R^{X2}$ are both alkyl groups, the alkyl groups preferably have different numbers of carbon atoms.

In further detail, a compound in which $R^{X1}$ represents a propyl group and $R^{X2}$ represents an ethyl group, or a compound in which $R^{X1}$ represents a butyl group and $R^{X2}$ represents an ethyl group is preferred.

The liquid crystal composition of the present invention can further contain a compound represented by general formula (C).

[Chem. 131]

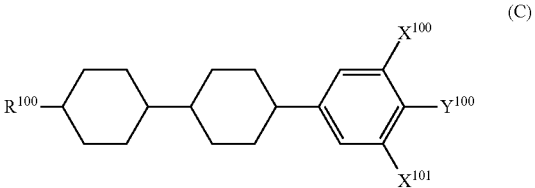

(C)

(In the general formula, $R^{100}$ represents an alkyl group having 1 to 5 carbon atoms, an alkenyl group having 2 to 5 carbon atoms, or an alkoxy group having 1 to 4 carbon atoms, $X^{100}$ and $X^{101}$ each independently represent a hydrogen atom or a fluorine atom, and $Y^{100}$ represents a fluorine atom or —$OCF_3$.)

$R^{100}$ is preferably an alkyl group having 3 carbon atoms. $X^{100}$ and $X^{101}$ are each preferably a fluorine atom. $Y^{100}$ is preferably a fluorine atom.

The range of a preferred content is preferably 0% to 10% by mass, 2% to 8% by mass, or 3% to 7% by mass.

The liquid crystal composition of the present invention can be used within a wide range of nematic-isotropic liquid phase transition temperatures ($T_{NI}$) which is preferably 60° C. to 120° C., more preferably 70° C. to 100° C., and particularly preferably 70° C. to 90° C.

The liquid crystal composition of the present invention contains the compounds represented by the formula (i) and the formula (XIII-1-2) or formula (XIII-1-4) as essential components, and according to a more preferred embodiment, the liquid crystal composition can further contain the compounds represented by the general formula (L) and the general formula (X). In this case, the contents are preferably as described below.

When the compounds represented by the formula (i), the formula (XIII-1-2), the formula (XIII-1-4) and the general formula (L) are contained, the total content of these compounds is preferably 40% to 80% by mass, more preferably 42% to 75% by mass, still more preferably 45% to 70% by mass, particularly preferably 50% to 68% by mass, and most preferably 50% to 65% by mass.

When the compounds represented by the formula (i), the formula (XIII-1-2), the formula (XIII-1-4) and the general formula (X) are contained, the total content of these compounds is preferably 40% to 90% by mass, more preferably 45% to 90% by mass, still more preferably 47% to 88% by mass, particularly preferably 50% to 85% by mass, and most preferably 53% to 85% by mass.

When the compounds represented by the formula (i), the formula (ii-b), the general formula (L) and the general formula (X) are contained, the total content of these compounds is preferably 60% to 100% by mass, more preferably 63% to 100% by mass, still more preferably 70% to 100% by mass, and particularly preferably 75% to 100% by mass.

When the compound represented by the general formula (L) is a compound represented by the general formula (II-a) or the general formula (I-a), the content is preferably as described below.

When the compounds represented by the formula (i), the formula (XIII-1-2), the formula (XIII-1-4), the general formula (II-a), the general formula (I-a), and the general formula (X) are contained, the total content of these compounds is preferably 80% to 100% by mass, more preferably 85% to 100% by mass, still more preferably 90% to 100% by mass, and particularly preferably 95% to 100% by mass.

When the liquid crystal composition of the present invention is required to have chemical stability, the compounds used preferably do not have a chlorine atom in the molecules thereof. Further, the content of a compound having a chlorine atom in the liquid crystal composition is preferably 5% or less, preferably 3% or less, preferably 1% or less, and preferably 0.5% or less, and such a compound is preferably substantially not contained. The expression "substantially not contained" represents that the liquid crystal composition is unintentionally contaminated with only a compound containing a chlorine atom, such as a compound produced as impurities during production of the compound.

The compounds used in the present invention do not have a peroxy acid (—CO—OO—) structure in the molecules thereof. Also, when reliability and long-term stability of the liquid crystal composition are regarded as important, a compound having a cyano group or a carbonyl group is preferably not used. In addition, when UV irradiation stability is regarded as important, a compound substituted by a chlorine atom is preferably not used. Also, only compounds in which all ring structures in its molecule are 6-member rings are preferably used.

The value of dielectric anisotropy $\Delta\epsilon$ at 25° C. of the liquid crystal composition of the present invention is preferably −2.0 to −6.0, more preferably −2.5 to −5.0, and particularly preferably −2.5 to −4.0. In further detail, when the response speed is regarded as important, the value is preferably −2.5 to −3.4, and when the drive voltage is regarded as important, the value is preferably −3.4 to −4.0.

The value of refractive index anisotropy $\Delta n$ at 25° C. of the liquid crystal composition of the present invention is preferably 0.08 to 0.13 and more preferably 0.09 to 0.12. In further detail, in correspondence with a thin cell gap, the value is preferably 0.10 to 0.12, and in correspondence with a thick cell gap, the value is preferably 0.08 to 0.10.

The rotational viscosity ($\gamma_1$) of the liquid crystal composition of the present invention is preferably 150 or less, more preferably 130 or less, and particularly preferably 120 or less.

The liquid crystal composition of the present invention preferably exhibits a specified value of Z which is a function of rotational viscosity and refractive index anisotropy.

$$Z = \gamma 1 / \Delta n^2 \quad [\text{Math. 1}]$$

(In the formula, $\gamma_1$ represents rotational viscosity and $\Delta n$ represents refractive index anisotropy.)

Z is preferably 13000 or less, more preferably 12000 or less, and particularly preferably 11000 or less.

When the liquid crystal composition of the present invention is used for an active matrix display device, the liquid crystal composition is required to have a resistivity of $10^{12}$ ($\Omega$·m) or more, and preferably has a resistivity of $10^{13}$ ($\Omega$·m) and more preferably $10^{14}$ ($\Omega$·m) or more.

Besides the above-described compounds, the liquid crystal composition of the present invention may further contain a usual nematic liquid crystal, smectic liquid crystal, cholesteric liquid crystal, antioxidant, ultraviolet absorber, or polymerizable monomer according to application.

A difunctional monomer represented by general formula (P) is preferred as the polymerizable monomer.

[Chem. 132]

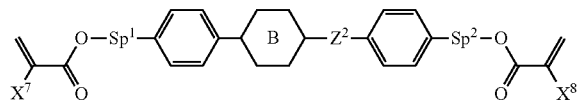

(P)

(In the formula, $X^7$ and $X^8$ each independently represent a hydrogen atom or a methyl group, $Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^2$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (wherein $Y^1$ and $Y^2$ each independently represent a fluorine atom or a hydrogen atom), —C≡C—, or a single bond, B represents a 1,4-phenylene group, a trans-1,4-cyclohexylene group, or a single bond, and any hydrogen atom of all 1,4-phenylene groups in the formula may be substituted by a fluorine atom.)

Either a diacrylate derivative in which $X^7$ and $X^8$ both represent hydrogen atoms or a dimethacrylate derivative in which $X^7$ and $X^8$ both represent methyl groups is preferred, and a compound in which one of $X^7$ and $X^8$ represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

$Sp^1$ and $Sp^2$ each independently represent a single bond, an alkylene group having 1 to 8 carbon atoms, or —O—$(CH_2)_s$—, but at least one of $Sp^1$ and $Sp^2$ is preferably a single bond for a PSA display device. Specifically, a compound in which $Sp^1$ and $Sp^2$ both represent single bonds or a form in which one represents a single bond, and the other represents an alkylene group having 1 to 8 carbon atoms, or —O—$(CH_2)_s$— is preferred. In this case, a 1-4 alkyl group is preferred, and s is preferably 1 to 4.

$Z^1$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

B represents a 1,4-phenylene group in which a desired hydrogen atom may be substituted by a fluorine atom, a trans-1,4-cyclohexylene group, or a single bond, but a 1,4-phenylene group or a single bond is preferred. When C represents a ring structure other than a single bond, $Z^2$ is also preferably a linkage group other than a single bond, and when C is a single bond, $Z^1$ is preferably a single bond.

In view of the above, specifically, a ring structure between $Sp^1$ and $Sp^2$ in the general formula (P) is preferably a structure described below.

In the general formula (P), when C represents a single bond, and the ring structure includes two rings, the ring structure is preferably represented by formula (Pa-1) to formula (Pa-5),

[Chem. 133]

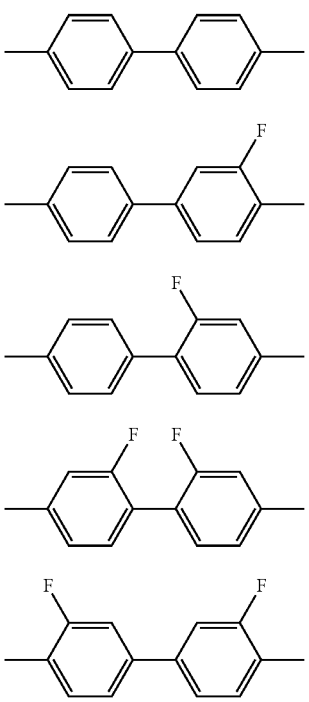

(Pa-1)
(Pa-2)
(Pa-3)
(Pa-4)
(Pa-5)

(in the formulae, each end is bonded to Sp$^1$ or Sp$^2$), more preferably represented by formula (Pa-1) to formula (Pa-3), and particularly preferably represented by formula (Pa-1).

A polymerizable compound having such a skeleton has, after polymerization, alignment regulating force optimum for a PSA-mode liquid crystal display device, and thus a good alignment state can be achieved, thereby suppressing display unevenness or causing no display unevenness.

In view of the above, polymerizable monomers of general formula (Pa-1-1) to general formula (Pa-1-4) are particularly preferred, and general formula (Pa-1-2) is most preferred.

[Chem. 134]

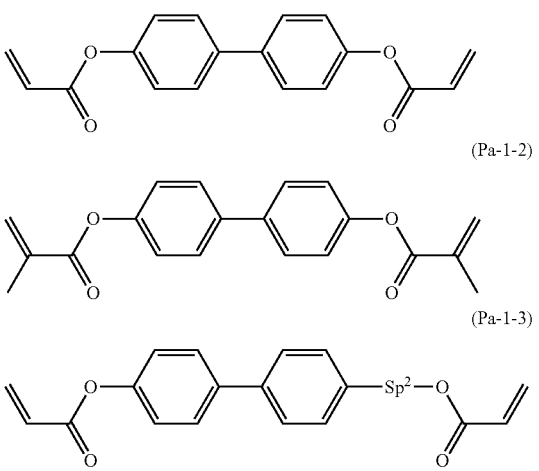

(Pa-1-1)
(Pa-1-2)
(Pa-1-3)
(Pa-1-4)

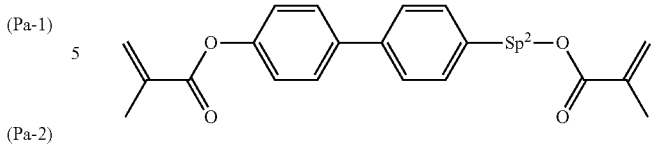

(In the formulae, Sp$^2$ represents an alkylene group having 2 to 5 carbon atoms.)

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like. Also, a stabilizer may be added for improving storage stability. Examples of the stabilizer which can be used include hydroquinones, hydroquinone monoalkyl ethers, tertiary butyl catechols, pyrogallols, thiophenols, nitro compounds, β-naphthyl amines, β-naphthols, nitroso compounds, and the like.

The liquid crystal composition of the present invention can further contain a compound represented by general formula (Q).

[Chem. 135]

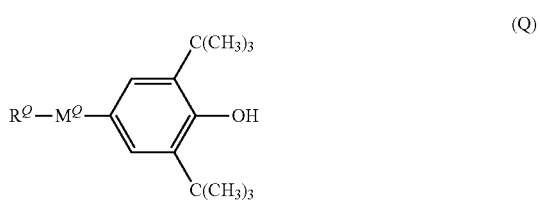

(Q)

(In the formula, R$^Q$ represents a linear alkyl group or branched alkyl group having 1 to 22 carbon atoms, one or two or more CH$_2$ groups in the alkyl group may be substituted by —O—, —CH=CH—, —CO—, —OCO—, —COO—, —C≡C—, —CF$_2$O—, or —OCF$_2$— so that oxygen atoms are not directly adjacent to each other, and M$^Q$ represents a trans-1,4-cyclohexylene group, a 1,4-phenylene group, or a single bond.)

R$^Q$ represents a linear alkyl group or branched alkyl group having 1 to 22 carbon atoms, and one or two or more CH$_2$ groups in the alkyl group may be substituted by —O—, —CH=CH—, —CO—, —OCO—, —COO—, —C≡C—, —CF$_2$O—, or —OCF$_2$— so that oxygen atoms are not directly adjacent to each other, but R$^Q$ is preferably a linear alkyl group having 1 to 10 carbon atoms, a linear alkoxy group, a linear alkyl group in which one —CH$_2$— group is substituted by —OCO— or —COO—, a branched alkyl group, a branched alkoxy group, or a branched alkyl group in which one —CH$_2$— group is substituted by —OCO— or —COO—, and more preferably a linear alkyl group having 1 to 20 carbon atoms, a linear alkyl group in which one —CH$_2$— group is substituted by —OCO— or —COO—, a branched alkyl group, a branched alkoxy group, or a branched alkyl group in which one —CH$_2$— group is substituted by —OCO— or —COO—. M$^Q$ represents a trans-1,4-cyclohexylene group, a 1,4-phenylene group, or a single bond, but is preferably a trans-1,4-cyclohexylene group or a 1,4-phenylene group.

More specifically, preferred examples of the compound represented by the general formula (Q) include compounds represented by general formula (Q-a) to general formula (Q-d) below.

[Chem. 136]

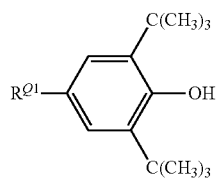
(Q-a)

[Chem. 137]

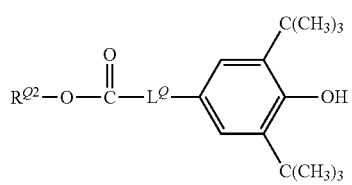
(Q-b)

[Chem. 138]

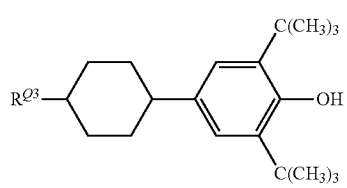
(Q-c)

[Chem. 139]

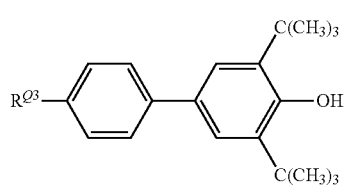
(Q-d)

In the formulae, $R^{Q1}$ is preferably a linear alkyl group or branched alkyl group having 1 to 10 carbon atoms, $R^{Q2}$ is preferably a linear alkyl group or branched alkyl group having 1 to 20 carbon atoms, $R^{Q3}$ is preferably a linear alkyl group or branched alkyl group having 1 to 8 carbon atoms, a linear alkoxy group, or a branched alkoxy group, and $L^Q$ is preferably a linear alkylene group or branched alkylene group having 1 to 8 carbon atoms. Among compounds represented by the general formula (Q-a) to the general formula (Q-d), compounds represented by the general formula (Q-c) and the general formula (Q-d) are more preferred.

The liquid crystal composition of the preset invention preferably contains one or two compounds and more preferably one to five compounds represented by the general formula (Q). The content thereof is preferably 0.001% to 1% by mass, more preferably 0.001% to 0.1% by mass, and particularly preferably 0.001% to 0.05% by mass.

The liquid crystal composition containing the polymerizable compound of the present invention is useful for liquid crystal display devices and particularly useful for liquid crystal display devices for active matrix drive, and can be used for a PSA mode, PSVA mode, VA mode, IPS mode, or ECB mode liquid crystal display device.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (nematic liquid crystal display device), STN-LCD (super twisted nematic liquid crystal display device), OCB-LCD, and IPS-LCD (in-plane switching liquid crystal display device), and particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by sputtering indium tin oxide (ITO) on a transparent substrate such as a glass plate or the like.

The substrates are opposed to each other so that the transparent electrode layers face inward. In this case, the gap between the substrates may be adjusted through a spacer. The resulting light control layer is preferably adjusted to have a thickness of 1 to 100 μm. The thickness is more preferably 1.5 to 10 μm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a retardation film can be used for widening the angle of view. Examples of the spacer include glass particles, plastic particles, alumina particles, photoresist materials, and the like. Then, a sealing agent such as an epoxy-based heat-curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates, but the vacuum injection method has the problem of leaving injection marks, in spite of causing no dropping marks. However, the present invention can preferably use the ODF method in a process for manufacturing a liquid crystal display device.

Since an appropriate polymerization rate is desired for achieving good liquid crystal-aligning performance, a preferred method of polymerizing the polymerizable compound is a polymerization method in which the compound is polymerized by irradiation with one or combination of two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with proper transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

The liquid crystal display device of the present invention has a configuration which, as shown in FIG. 1, includes a first substrate provided with a common electrode which is composed of a transparent conductive material, a second substrate provided with a pixel electrode which is composed of a transparent conductive material and disposed in each pixel and a thin film transistor that controls the pixel electrode, and a liquid crystal composition held between the first substrate and the second substrate, and alignment of liquid crystal molecules in the liquid crystal composition is substantially vertical to the substrates without a voltage applied, wherein the liquid crystal composition of the preset invention described above is used as the liquid crystal composition.

The occurrence of dropping marks is greatly influenced by the liquid crystal material injected, and the influence by the configuration of the display device cannot be avoided. In particular, a color filter, a thin-film transistor, and the like are formed in the liquid crystal display device so as to be separated from the liquid crystal composition only by members such as a thin alignment film, transparent electrode, etc., thereby causing the influence on the occurrence of dropping marks according to combination thereof.

In particular, when the thin-film transistor is an inverted staggered type, a drain electrode is formed to cover a gate electrode, and thus the area of the drain electrode tends to increase. The drain electrode is composed of a metal material such as copper, aluminum, chromium, titanium, molybdenum, tantalum, or the like, and is generally subjected to passivation treatment. However, a protective film and an alignment film are thin and are thus highly likely not to cut off ionic substances. Therefore, the occurrence of dropping marks due to interaction between the metal material and the liquid crystal material cannot be avoided.

Figure 2:
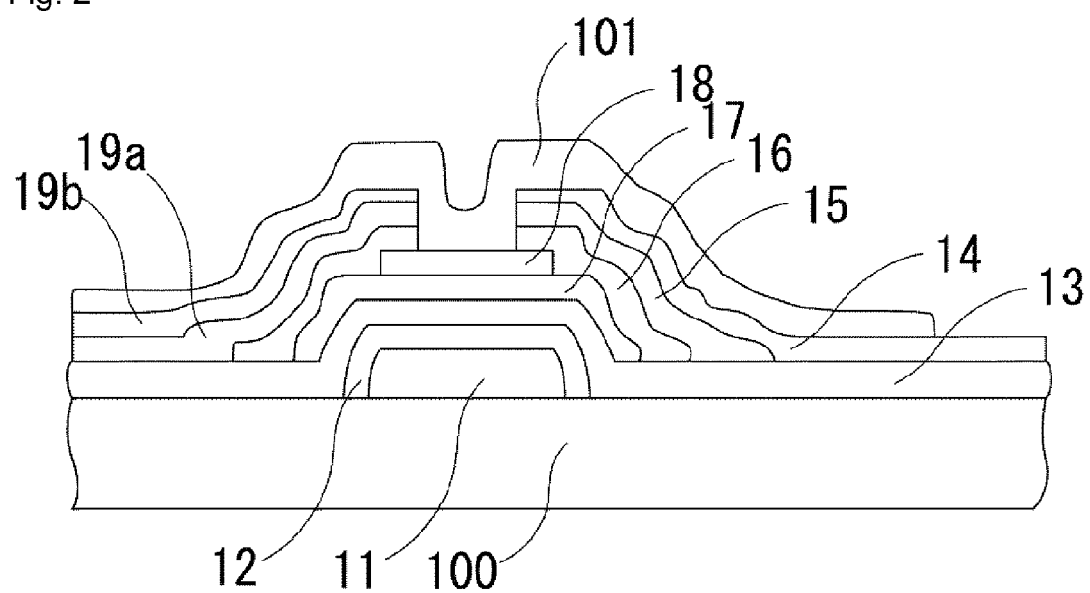
FIG. 2 is a drawing showing an example of a configuration of an inverted staggered-type thin-film transistor.

The present invention can be preferably used for a liquid crystal display device including an inverted staggered-type thin-film transistor as shown in FIG. 2, and is preferred for a case using aluminum wiring.

The liquid crystal display device using the liquid crystal composition of the present invention is useful, particularly useful for a liquid crystal display device for active matrix driving, because both fast response and suppression of display defects are achieved, and the liquid crystal display device can be applied to a liquid crystal display device for a VA mode, a PSVA mode, a PSA mode, an IPS mode, or an ECB mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{Ni}$: nematic-isotropic liquid phase transition temperature (° C.)

Δn: refractive index anisotropy at 20° C.

Δ∈: dielectric anisotropy at 20° C.

η: viscosity at 20° C. (mPa·s)

$γ_1$: rotational viscosity at 20° C. (mPa·s)

VHR: voltage holding ratio (%) at 70° C. under the conditions of a frequency of 60 Hz and a voltage of 5 V applied VHR after heat resistance test: measured under the same conditions as in the VHR measurement method described above after maintaining for 30 minutes, in a constant-temperature oven of 120° C., a TEG (Test Element Group) for VHR measurement in which a liquid crystal composition was injected.

Image Sticking:

Image sticking of a liquid crystal display device was evaluated by display of a predetermined fixed pattern within a display area for 1200 hours and then uniform display over the entire screen to visually observe the level of residual image of the fixed pattern based on the following 4 levels:

A: No residual image (excellent level)

B: Slight residual image at an allowable level (good level)

C: Residual image at an unallowable level (not good level)

D: Significant residual image (poor level)

Dropping Marks:

Dropping marks of a liquid crystal display device were evaluated by visually observing white dropping marks appearing on the surface of a full black display based on the following 4 levels:

A: No residual image (excellent level)

B: Slight residual image at an allowable level (good level)

C: Residual image at an unallowable level (not good level)

D: Significant residual image (poor level)

Process Adaptability:

Process adaptability was evaluated by dropping 25 pL at each of 100000 times of dropping using a constant-volume measuring pump in an ODF process and measuring a change in amount of liquid crystal dropped 200 times in each of 10 to 200 times, 201 to 400 times, 401 to 600 times, ..., and 99801 to 100000 times dropping based on four levels described below.

A: Very small change (excellent level where a liquid crystal display device can be stably manufacture)
B: Slight change at an allowable level (good level)
C: Some change at an unallowable level (not a good level where yield is degraded due to the occurrence of spots)
D: Significant change (occurrence of liquid crystal leakage or vacuum air bubbles) (poor level)

Solubility at Low Temperature:

After a liquid crystal composition was prepared, solubility at a low temperature was evaluated by weighing 0.5 g of the liquid crystal composition in a 1 mL sample bottle, and then continuously changing the temperature in a cycle of "−25° C. (kept for 1 hour), temperature rise (0.1° C./min), 0° C. (kept for 1 hour), temperature rise (0.1° C./min), 25° C. (kept for 1 hour), temperature drop (−0.1° C./min), 0° C. (kept for 1 hour), temperature drop (−0.1° C./min), and −25° C." in a temperature-controlled test chamber to visually observe the occurrence of precipitates of the liquid crystal composition based on four levels described below.

A: Precipitates were not observed for 672 hours or more (excellent level)
B: Precipitates were not observed for 336 hours or more (good level)
C: Precipitates were observed within 168 hours (not good level)
D: Precipitates were observed within 84 hours (poor level)

In the examples, compounds are described by using abbreviations below.

(Side Chain Structure and Linkage Structure)
-n —$C_nH_{2n+1}$ linear alkyl group having n carbon atoms
n- $C_nH_{2n+1}$— linear alkyl group having n carbon atoms
—On —$OC_nH_{2n+1}$ linear alkoxy group having n carbon atoms
nO— $C_nH_{2n+1}O$— linear alkoxy group having n carbon atoms
-V —CH=$CH_2$
V- $CH_2$=CH—
-V1-CH=CH—$CH_3$
1V- $CH_3$—CH=CH—
-2V —$CH_2$—$CH_2$—CH=$CH_3$
V2- $CH_3$—CH=CH—$CH_2$—$CH_2$—
-2V1-$CH_2$—$CH_2$—CH=CH—$CH_3$
1V2- $CH_3$—CH=CH—$CH_2$—$CH_2$ (Ring Structure)

[Chem. 140]

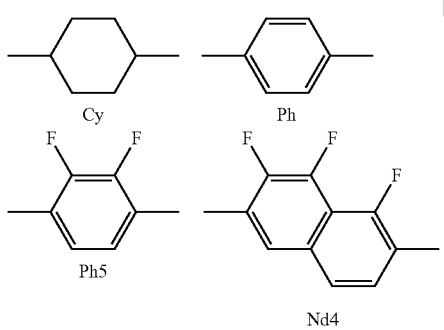

-continued

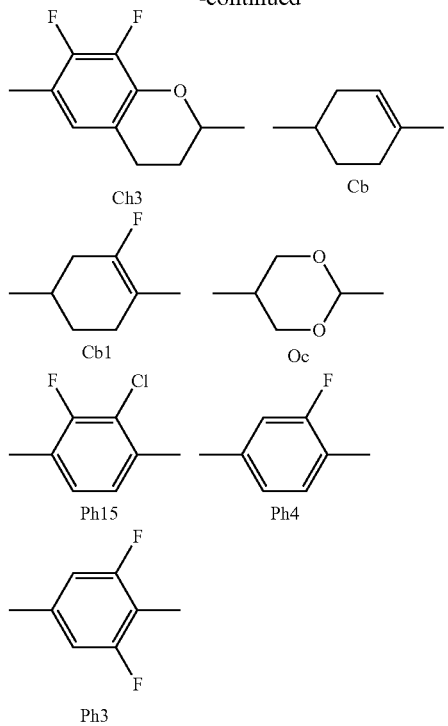

Comparative Example 1 and Examples 1 to 3

Liquid crystal compositions (LC-1 to 4) having compositions shown below were prepared, and physical property values thereof were measured. The results are shown in a table below.

A VA liquid crystal display device shown in FIG. 1 was formed by using each of the liquid crystal compositions. The liquid crystal display device includes an inverted staggered-type thin-film transistor as an active element. The liquid crystal composition was injected by the ODF method, and image sticking, dropping marks, and process adaptability, and solubility at a low temperature were evaluated.

Symbols described on the left side of contents are abbreviations of the compounds.

TABLE 1

| | Ratio (%) | | | |
|---|---|---|---|---|
| Chemical structure | LC-1 | LC-2 | LC-3 | LC-4 |
| 4-CyCy-V | 20 | 10 | | 20 |
| 3-CyCy-2 | | 10 | 20 | 16 |
| 3-CyCy-4 | 7 | 7 | 7 | |
| 3-CyCy-O1 | 9 | 9 | 9 | |
| 5-CyPh-3 | 4 | 4 | 4 | 4 |
| 5-CyPh5—O2 | 8 | 8 | 8 | 8 |
| 3-CyCyPh5—O3 | 7 | 7 | 7 | 7 |
| 4-CyCyPh5—O2 | 7 | 7 | 7 | 7 |
| 2-CyPhPh5—O2 | 11 | 11 | 11 | 11 |
| 3-CyPhPh5—O2 | 10 | 10 | 10 | 10 |
| 3-PhPh5Ph-2 | 8 | 8 | 8 | 8 |
| 4-PhPh5Ph-2 | 9 | 9 | 9 | 9 |
| $T_{NI}$/° C. | 83.2 | 83.1 | 82.9 | 82.0 |
| Δn | 0.116 | 0.114 | 0.111 | 0.114 |
| Δε | −2.6 | −2.5 | −2.5 | −2.5 |
| η/mPa · s | 26 | 24 | 22 | 22 |
| $γ_1$/mPa · s | 174 | 167 | 160 | 153 |

TABLE 1-continued

| Chemical structure | Ratio (%) | | | |
|---|---|---|---|---|
| | LC-1 | LC-2 | LC-3 | LC-4 |
| Initial VHR (%) | 99.0 | 99.4 | 99.6 | 99.1 |
| VHR (%) after heat resistance test | 96.9 | 97.5 | 99.0 | 97.0 |
| Evaluation of image sticking | D | C | A | C |
| Evaluation of dropping marks | C | B | A | A |
| Evaluation of manufacturing apparatus contamination | B | A | A | B |
| Process adaptability | C | B | A | B |
| Evaluation of solubility at low temperature | C | B | B | B |

It was found that the liquid crystal compositions LC-2 to 4 of Examples 1 to 3 have lower viscosity η and rotational viscosity γ1 than the liquid crystal composition LC-1 of Comparative Example 1 which does not contain the compound represented by formula (i), and are excellent in valuation of image sticking, dropping marks, process adaptability, and solubility at a low temperature.

Examples 4 to 7

Liquid crystal compositions (LC-5 to 8) having compositions shown below were prepared, and physical property values thereof were measured. Also, image sticking, dropping marks, and process adaptability, and solubility at a low temperature were evaluated by using a liquid crystal display device. The results are shown below.

TABLE 2

| Chemical structure | Ratio (%) | | | |
|---|---|---|---|---|
| | LC-5 | LC-6 | LC-7 | LC-8 |
| 3-CyCy-2 | 22 | 21 | 27 | 25 |
| 3-CyCy-4 | 6 | 7 | 6 | 6 |
| 3-CyCy-O1 | 3.5 | 3.5 | 3.5 | 5.5 |
| 3-CyPyPh-1 | 7 | 7 | | |
| 3-CyPhPh-2 | 5 | 5 | | |
| 3-CyPh5—O2 | | | | 9 |
| 5-CyPh5—O2 | | | | 7 |
| 3-PhPh5—O2 | 11 | 5 | 9 | |
| 3-PhPh5—O4 | 10 | 10 | 7 | |
| 3-CyCyPh5—O2 | 7.5 | 7.5 | 7.5 | 7.5 |
| 4-CyCyPh5—O2 | 4 | 4 | 4 | 4 |
| 3-CyCyPh5—O3 | | | 7 | 7 |
| 2-CyPhPh5—O2 | 10 | 10 | 10 | 10 |
| 3-CyPhPh5—O2 | 10 | 10 | 10 | 10 |
| 3-CyPhPh5—O3 | | | 5 | 5 |
| 3-PhPh5Ph-2 | 4 | 10 | 4 | 4 |
| $T_{NI}$/° C. | 79.2 | 87.0 | 80.2 | 81.5 |
| Δn | 0.121 | 0.127 | 0.113 | 0.101 |
| Δε | −3.74 | −3.20 | −3.87 | −3.36 |
| η/mPa · s | 19.0 | 20.5 | 21.0 | 22.7 |
| γ1/mPa · s | 138 | 158 | 157 | 160 |
| Initial VHR (%) | 99.0 | 99.4 | 99.6 | 99.1 |
| VHR (%) after heat resistance test | 96.9 | 98.0 | 99.0 | 97.0 |
| Evaluation of image sticking | B | A | B | A |
| Evaluation of dropping marks | B | B | B | A |
| Evaluation of manufacturing apparatus contamination | A | A | B | B |
| Process adaptability | C | A | B | B |

TABLE 2-continued

| Chemical structure | Ratio (%) | | | |
|---|---|---|---|---|
| | LC-5 | LC-6 | LC-7 | LC-8 |
| Evaluation of solubility at low temperature | C | B | B | A |

Of the liquid crystal compositions LC-5 to 8 of Examples 4 to 7, the liquid crystal composition LC-5 of Example 4 contains a compound represented by the formula (i) and compound represented by the formula (XIII-1-2) added in a total amount of 26% by mass and thus shows slightly poor but good results.

Examples 8 to 12

Liquid crystal compositions (LC-9 to 13) having compositions shown below were prepared, and physical property values thereof were measured. Also, image sticking, dropping marks, and process adaptability, and solubility at a low temperature were evaluated by using a liquid crystal display device. The results are shown below.

TABLE 3

| Chemical structure | Ratio (%) | | | | |
|---|---|---|---|---|---|
| | LC-9 | LC-10 | LC-11 | LC-12 | LC-13 |
| 3-CyCy-2 | 24 | 23 | 30 | 30 | 30 |
| 3-CyCy-4 | 10 | 11 | | 11 | |
| 3-CyCy-O1 | 7 | 7 | 11 | | |
| 3-CyCyPh-1 | | | | | 11 |
| 3-CyPh5—O2 | 12 | 12 | 12 | 12 | 12 |
| 3-CyPh5—O4 | | | | | 5 |
| 3-CyCyPh5—O2 | | 5 | 5 | | |
| 3-CyCyPh5—O3 | | 9 | 9 | 9 | 9 |
| 4-CyCyPh5—O2 | 9 | | | 5 | |
| 5-CyCyPh5—O2 | 5 | | | | |
| 2-CyPhPh5—O2 | 9 | 9 | 9 | 9 | 9 |
| 3-CyPhPh5—O2 | 9 | 9 | 9 | 9 | 9 |
| 3-PhPh5Ph-2 | 7 | 8 | 8 | 8 | 8 |
| 4-PhPh5Ph-2 | 8 | 7 | 7 | 7 | 7 |
| $T_{NI}$/° C. | 79.1 | 77.4 | 71.6 | 80.1 | 80.9 |
| Δn | 0.109 | 0.109 | 0.110 | 0.106 | 0.113 |
| Δε | −2.58 | −2.59 | −2.48 | −2.58 | −2.67 |
| η/mPa · s | 20.2 | 19.9 | 19.2 | 18.7 | 19.8 |
| γ1/mPa · s | 150 | 148 | 145 | 138 | 144 |
| Initial VHR (%) | 99.3 | 99.5 | 99.6 | 99.4 | 99.2 |
| VHR (%) after heat resistance test | 98.6 | 99.2 | 99.1 | 98.8 | 98.4 |
| Evaluation of image sticking | A | A | A | A | A |
| Evaluation of dropping marks | A | A | A | A | A |
| Evaluation of manufacturing apparatus contamination | A | A | A | A | A |
| Process adaptability | B | A | A | A | B |
| Evaluation of solubility at low temperature | A | A | A | B | B |

It was found that the liquid crystal compositions LC-9 to 13 of Examples 8 to 12 have low viscosity η and rotational viscosity γ1, and are excellent in valuation of various panel performances, process adaptability, and solubility at a low temperature.

Examples 13 to 16

Liquid crystal compositions (LC-14 to 17) having compositions shown below were prepared, and physical property values thereof were measured. Also, image sticking, dropping marks, and process adaptability, and solubility at a low temperature were evaluated by using a liquid crystal display device. The results are shown below.

TABLE 4

| | Ratio (%) | | | |
|---|---|---|---|---|
| Chemical structure | LC-14 | LC-15 | LC-16 | LC-17 |
| 3-CyCy-2 | 22 | 24 | 27 | 23 |
| 3-CyCy-4 | 7 | 11 | 10 | 3 |
| 3-CyCy-O1 | 6 | | | 2 |
| 3-CyPh5—O1 | 4 | 8 | 7 | |
| 3-CyPh5-5 | | | | 4 |
| 3-CyCyPh5—1 | 4 | | | |
| 3-CyPh5—O2 | 11 | 13 | 14 | 13 |
| 3-CyPh5—O4 | 4 | | | |
| 5-CyPh5—O2 | | | | 7 |
| 3-CyCyPh5—O2 | 11 | | | 11 |
| 3-CyCyPh5—O3 | | 8 | 8 | |
| 4-CyCyPh5—O2 | | 9 | 9 | 6 |
| 2-CyPhPh5—O2 | 11 | 5 | 5 | 11 |
| 3-CyPhPh5—O2 | 10 | 10 | 11 | 11 |
| 3-PhPh5Ph5-2 | 10 | 12 | 9 | 9 |
| $T_{NI}/°$ C. | 75.5 | 77.5 | 75.9 | 77.2 |
| $\Delta n$ | 0.105 | 0.103 | 0.097 | 0.106 |
| $\Delta \varepsilon$ | -2.77 | -2.55 | -2.59 | -3.62 |
| $\eta$/mPa · s | 19.5 | 18.9 | 17.9 | 22.2 |
| $\gamma_1$/mPa · s | 138 | 138 | 128 | 137 |
| Initial VHR (%) | 99.3 | 99.5 | 99.3 | 99.4 |
| VHR (%) after heat resistance test | 98.6 | 99.2 | 98.6 | 98.8 |
| Evaluation of image sticking | A | A | A | B |
| Evaluation of dropping marks | B | A | B | A |
| Evaluation of manufacturing apparatus contamination | A | A | A | A |
| Process adaptability | B | B | B | A |
| Evaluation of solubility at low temperature | A | A | A | B |

Good results were obtained by the liquid crystal compositions LC-14 to 17 of Examples 13 to 16.

Examples 17 to 20

Liquid crystal compositions (LC-18 to 21) having compositions shown below were prepared, and physical property values thereof were measured. Also, image sticking, dropping marks, and process adaptability, and solubility at a low temperature were evaluated by using a liquid crystal display device. The results are shown below.

TABLE 5

| | Ratio (%) | | | |
|---|---|---|---|---|
| Chemical structure | LC-18 | LC-19 | LC-20 | LC-21 |
| 3-CyCy-2 | 22 | 23 | 23 | 27 |
| 3-CyCy-4 | 10 | 11 | 11 | 10 |
| 3-CyCy-O1 | | 4 | | |
| 3-CyPh5—O1 | | | 8 | 7 |
| 3-CyPh5-5 | | | | |
| 3-CyCyPh5-1 | | | | |
| 3-CyPh5—O2 | 15 | 15 | 13 | 14 |
| 3-CyPh5—O4 | | | | |
| 5-CyPh5—O2 | 5 | | | |
| 3-CyCyPh5—O2 | 11 | 10 | | |
| 3-CyCyPh5—O3 | | | 9 | 8 |
| 4-CyCyPh5—O2 | | | 9 | 9 |

TABLE 5-continued

| | Ratio (%) | | | |
|---|---|---|---|---|
| Chemical structure | LC-18 | LC-19 | LC-20 | LC-21 |
| 2-CyPhPh5—O2 | 12 | 12 | 5 | 5 |
| 3-CyPhPh5—O2 | 12 | 12 | 10 | 11 |
| 3-PhPh5Ph5-2 | 7 | 9 | 12 | 9 |
| 3-CyCyPh3-F | 6 | 4 | | |
| $T_{NI}/°$ C. | 72.4 | 74.1 | 78.7 | 75.9 |
| $\Delta n$ | 0.099 | 0.101 | 0.103 | 0.097 |
| $\Delta \varepsilon$ | -3.16 | -2.79 | -2.62 | -2.59 |
| $\eta$/mPa · s | 17.8 | 17.3 | 19.6 | 17.9 |
| $\gamma_1$/mPa · s | 104 | 110 | 143 | 128 |
| Initial VHR (%) | 99.2 | 99.4 | 99.5 | 99.3 |
| VHR (%) after heat resistance test | 98.4 | 98.8 | 99.2 | 98.6 |
| Evaluation of image sticking | B | B | A | A |
| Evaluation of dropping marks | A | A | A | B |
| Evaluation of manufacturing apparatus contamination | A | A | A | A |
| Process adaptability | B | A | B | B |
| Evaluation of solubility at low temperature | B | B | A | A |

Good results were obtained by the liquid crystal compositions LC-18 to 21 of Examples 17 to 20.

Example 21

A polymerizable liquid crystal composition CLC-A was prepared by adding 0.15% of a polymerizable compound described below to 99.85% of the nematic liquid crystal composition LC-15 shown in Example 14 and uniformly dissolving.

[Chem. 141]

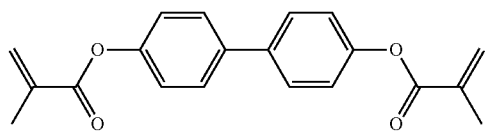

The physical property values of CLC-A were substantially the same as those of a nematic liquid crystal composition shown in Example 27. CLC-A was injected by a vacuum injection method into a cell with ITO, which had a cell gap of 3.5 μm and a polyimide alignment film applied for inducing homogeneous alignment. The liquid crystal cell was irradiated with ultraviolet light by using a high-pressure mercury lamp through a filter which cut off ultraviolet light of 320 nm or less while a rectangular wave at a frequency of 1 kHz was applied to the cell. The polymerizable compound in the polymerizable liquid crystal composition was polymerized by irradiation for 600 seconds so that the irradiation intensity on a cell surface was adjusted to 10 mW/cm², producing a vertical alignment liquid crystal display device. It was confirmed that alignment regulating force for the liquid crystal compound is produced by polymerizing the polymerizable compound.

The invention claimed is:
1. A liquid crystal composition with negative dielectric anisotropy, comprising;
a first component comprising a compound represented by formula (i),

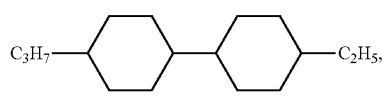

(i)

11% to 25% by mass of a second component comprising a compound represented by formula (XIII-1-2) and formula (XIII-1-4),

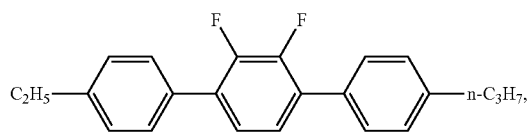

(XIII-1-2)

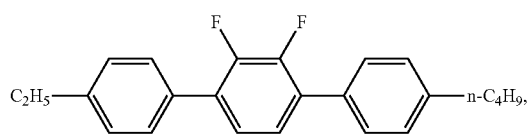

(XIII-1-4)

wherein a total content of the compounds represented by the formula (i), the formula (XIII-1-2), and the formula (XIII-1-4) is 29% to 61% by mass, and,
30% to 45% by mass of a compound represented by general formula (XII),

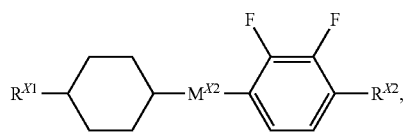

(XII)

wherein $R^{X1}$ and $R^{X2}$ each independently represent an alkyl group having 1 to 10 carbon atoms, an alkoxy group having 1 to 10 carbon atoms, or an alkenyl group having 2 to 10 carbon atoms, one methylene group or unadjacent two or more methylene groups present in these groups may be each independently substituted by —O— or —S—, and one or two or more hydrogen atoms present in these groups may be substituted by a fluorine atom or a chlorine atom;
$M^{X2}$ represents a group selected from the group consisting of
(a) a trans-1,4-cyclohexylene group (one methylene group or unadjacent two or more methylene groups present in the group may be substituted by —O— or —S—), and
(b) a 1,4-phenylene group (one —CH= or unadjacent two or more —CH= present in the group may be substituted by —N=);
hydrogen atoms contained in the group (a) or the group (b) may be each substituted by a cyano group, a fluorine atom, a trifluoromethyl group, a trifluoromethoxy group, or a chlorine atom, wherein the liquid crystal composition makes a liquid crystal display having an image sticking of no residual image.

2. The liquid crystal composition according to claim 1, further comprising one or two or more compounds represented by general formula (L),

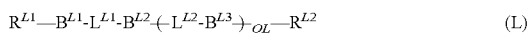

(L)

(in the formula, $R^{L1}$ and $R^{L2}$ each independently represent an alkyl group having 1 to 8 carbon atoms, one or unadjacent two or more —CH$_2$— in the alkyl group may be each independently substituted by —CH=CH—, —C≡C—, —O—, —CO—, —COO—, or —OCO—;
OL represents 0, 1, 2, or 3;
$B^{L1}$, $B^{L2}$, and $B^{L3}$ each independently represent a group selected from the group consisting of
(a) a 1,4-cyclohexylene group (one —CH$_2$— or unadjacent two or more —CH$_2$— present in the group may be substituted by —O—) and
(b) a 1,4-phenylene group (one —CH= or unadjacent two or more —CH= present in the group may be substituted by —N=);
the group (a) and the group (b) may be each independently substituted by any one of a cyano group, a fluorine atom, and a chlorine atom;
$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—; and
when OL is 2 or 3 and a plurality of $L^{L2}$ are present, $L^{L2}$ may be the same or different, and when OL is 2 or 3 and a plurality of $B^{L3}$ are present, $B^{L3}$ may be the same or different, wherein the compound represented by formula (L) does not overlap with the compound represented by the formula (i)).

3. The liquid crystal composition according to claim 2, wherein the compound the general formula (L) is a compound represented by general formula (II-a),

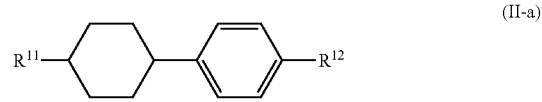

(II-a)

(in the formula, $R^{11}$ represents an alkyl group having 1 to 5 carbon atoms, an alkenyl group having 2 to 5 carbon atoms, or an alkoxy group having 1 to 4 carbon atoms, and $R^{12}$ represents an alkyl group having 1 to 5 carbon atoms, an alkenyl group having 4 to 5 carbon atoms, or an alkoxy group having 1 to 4 carbon atoms) and general formula (I-a),

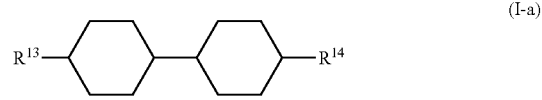

(I-a)

(in the formula, $R^{13}$ and $R^{14}$ each independently represent an alkyl group having 1 to 5 carbon atoms, and a compound having $R^{13}$ and $R^{14}$ representing alkyl groups having 3 and 2 carbon atoms is excluded), and one or two or more compounds represented by the general formula (II-a) are contained.

4. The liquid crystal composition according to claim 1, further comprising at least one selected from the group consisting of a compound represented by general formula (XI-1), general formula (XII-1), general formula (XII-2), and general formula (XIII),

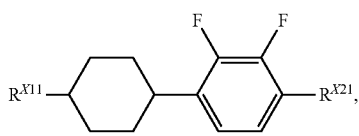
(XI-1)

(In the formula, $R^{X11}$ and $R^{X21}$ each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms),

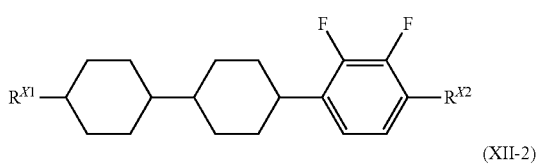
(XII-1)

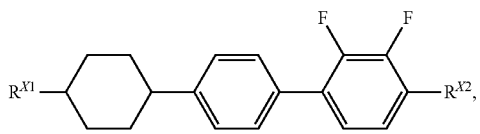
(XII-2)

(in the formulae, $R^{X1}$ represents the same meaning as $R^{X1}$ in the general formula (X), and $R^{X2}$ represents the same meaning as $R^{X2}$ in the general formula (X)),

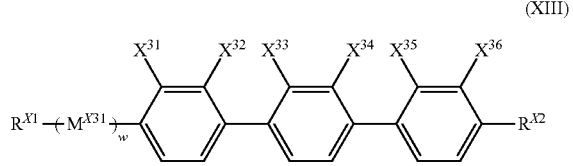
(XIII)

(in the formula, $R^{X1}$ represents the same meaning as $R^{X1}$ in the general formula (X), $M^{X31}$ represents the same meaning as $M^{X1}$ in the general formula (X), $R^{X2}$ represents the same meaning as $R^{X2}$ in the general formula (X), W represents 0 or 1, $X^{31}$ to $X^{36}$ each independently represent a hydrogen atom or a fluorine atom, and at least one combination of a combination of $X^{31}$ and $X^{32}$, a combination of $X^{33}$ and $X^{34}$, and a combination of $X^{35}$ and $X^{36}$ are both fluorine atoms, wherein the compound represented by formula (XIII) does not overlap with the compound represented by formula (XIII-1-2) or formula (XIII-1-4)).

5. The liquid crystal composition according to claim 4, wherein a compound represented by formula (XII-1-2) or formula (XII-1-7) is contained as the compound represented by the general formula (XII-1).

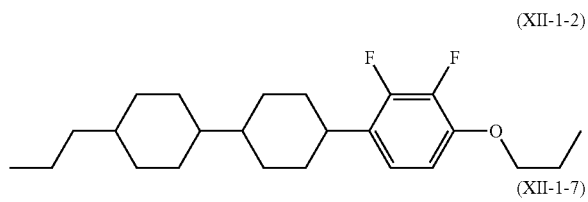
(XII-1-2)

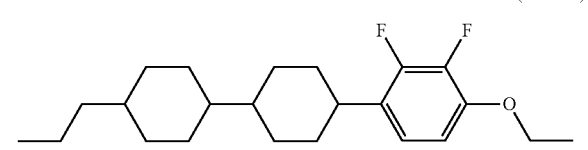
(XII-1-7)

6. The liquid crystal composition according to claim 5, wherein a content of the compound represented by formula (XII-1-2) is 7 to 22% by mass, or a content of the compound represented by formula (XII-1-7) is 9% to 24% by mass.

7. The liquid crystal composition according to claim 3, wherein a total content of the compounds represented by the formula (i), formula (XIII-1-2), formula (XIII-1-4), general formula (II-a), general formula (I-a), and general formula (XII) is 90% by mass to 100% by mass.

8. The liquid crystal composition according to claim 1, comprising the compound represented by the formula (XIII-1-4) is contained.

9. The liquid crystal composition according to claim 1, comprising a reactive monomer.

10. A liquid crystal display device comprising the liquid crystal composition according to claim 1.

11. A liquid crystal display device comprising the liquid crystal composition according to claim 9.

12. A liquid crystal display comprising the liquid crystal display device according to claim 10.

13. The liquid crystal composition according to claim 1, wherein the first component is contained in the liquid crystal composition at a content of 15 to 50% by mass.

14. The liquid crystal composition according to claim 2, wherein an evaluation of image sticking is carried out after displaying a fixed pattern on a predetermined area of the liquid crystal display device for 1200 hours, followed by displaying a uniform display on an entire of the predetermined area to visually observe a level of residual image of the fixed pattern.

* * * * *